US012805491B2

(12) United States Patent
Cardaropoli et al.

(10) Patent No.: US 12,805,491 B2
(45) Date of Patent: Nov. 24, 2026

(54) KIT AND ASSEMBLY FOR DISPENSING FRESH WATER TO FOWL

(71) Applicant: BACKYARD FARM SUPPLY COMPANY, LLC, Cornelius, NC (US)

(72) Inventors: Frank Cardaropoli, Mooresville, NC (US); Albert Brunner, Charlotte, NC (US); Laura Cardaropoli, Mooresville, NC (US)

(73) Assignee: BACKYARD FARM SUPPLY COMPANY, LLC, Cornelius, NC (US)

( * ) Notice: Subject to any disclaimer, the term of this patent is extended or adjusted under 35 U.S.C. 154(b) by 0 days.

(21) Appl. No.: 19/299,442

(22) Filed: Aug. 14, 2025

(65) Prior Publication Data

US 2026/0041068 A1 Feb. 12, 2026

Related U.S. Application Data

(63) Continuation-in-part of application No. PCT/US2024/016098, filed on Feb. 16, 2024.

(60) Provisional application No. 63/860,116, filed on Aug. 8, 2025.

(51) Int. Cl.
*A01K 39/02* (2006.01)

(52) U.S. Cl.
CPC .................................... *A01K 39/02* (2013.01)

(58) Field of Classification Search
CPC .... A01K 39/00; A01K 39/02; A01K 39/0206; A01K 39/0213; A01K 39/022; A01K 39/024; A01K 39/026; A01K 39/04; A01K 39/06
See application file for complete search history.

(56) References Cited

U.S. PATENT DOCUMENTS 730,374 A * 6/1903 Jones ..................... A01K 5/008 119/68
1,903,767 A * 4/1933 Karst ................... A01K 39/024 119/80
2,486,729 A 11/1949 Beckley
2,982,586 A * 5/1961 Gliebe ................... A01K 77/00 403/287
3,322,101 A 5/1967 Eagles et al.
(Continued)

FOREIGN PATENT DOCUMENTS

DE 1607215 A1 5/1970
DE 19717672 A1 * 10/1998 ........... A01K 1/0047
(Continued)

*Primary Examiner* — Ebony E Evans
(74) *Attorney, Agent, or Firm* — Nath, Goldberg & Meyer; Jerald L. Meyer; Stanley N. Protigal

(57) ABSTRACT

The kit and assembly for dispensing fresh water to fowl includes a water reservoir having opposed top and bottom ends and at least one water reservoir sidewall. At least one connector port is formed in the at least one water reservoir sidewall. At least one water distribution arm is provided. The at least one water distribution arm has opposed open and closed ends and at least one water distribution arm sidewall. At least one water distribution port is formed in the at least one water distribution arm sidewall, and at least one drinking valve is received within the at least one water distribution port. The open end of the at least one water distribution arm is releasably connected to, and releasably mated with, the at least one connector port of the water reservoir.

11 Claims, 40 Drawing Sheets

(56) References Cited

U.S. PATENT DOCUMENTS

| | | | | | |
|---|---|---|---|---|---|
| 3,418,977 | A | | 12/1968 | Godshalk | |
| 3,537,430 | A | * | 11/1970 | Peppler | A01K 39/0213 119/72.5 |
| 3,664,305 | A | * | 5/1972 | Hart | A01K 39/02 251/324 |
| 3,859,961 | A | * | 1/1975 | Willinger | A01K 1/03 119/416 |
| 4,284,036 | A | * | 8/1981 | Hostetler | A01K 39/0213 119/72.5 |
| 4,416,221 | A | | 11/1983 | Novey | |
| 4,589,373 | A | * | 5/1986 | Hostetler | A01K 39/0213 119/72.5 |
| 4,829,933 | A | | 5/1989 | Van der Veer | |
| 4,984,537 | A | | 1/1991 | Steudler, Jr. | |
| 5,016,574 | A | * | 5/1991 | Hostetler | A01K 39/0213 119/72.5 |
| 5,025,754 | A | * | 6/1991 | Plyler | A01K 7/02 119/73 |
| 5,222,462 | A | * | 6/1993 | Steudler, Jr. | A01K 39/0213 119/72.5 |
| 5,247,963 | A | * | 9/1993 | Hostetler | A01K 39/02 137/454.6 |
| 5,924,382 | A | * | 7/1999 | Shumaker | A01K 39/00 119/72 |
| 6,058,881 | A | | 5/2000 | Thompson | |
| 6,308,657 | B1 | | 10/2001 | Schumacher et al. | |
| 6,591,782 | B1 | * | 7/2003 | Googe, Jr. | A01K 39/0213 119/786 |
| D1,008,574 | S | * | 12/2023 | Lin | D30/132 |
| 12,419,271 | B2 | * | 9/2025 | Bernardini | A01K 7/06 |
| 2003/0136348 | A1 | | 7/2003 | Googe et al. | |
| 2013/0263789 | A1 | | 10/2013 | Delman | |
| 2014/0239215 | A1 | | 8/2014 | Cardaropoli | |
| 2018/0360001 | A1 | * | 12/2018 | Connolly | A01K 39/026 |
| 2020/0154681 | A1 | | 5/2020 | Correa | |

FOREIGN PATENT DOCUMENTS

| | | | | | |
|---|---|---|---|---|---|
| KR | 940000775 | Y1 | * | 2/1994 | A01K 63/003 |
| WO | 2024173760 | A1 | | 8/2024 | |

* cited by examiner

KIT AND ASSEMBLY FOR DISPENSING FRESH WATER TO FOWL

CROSS-REFERENCE TO RELATED APPLICATIONS

This application is a continuation-in-part of PCT Application No. PCT/US2024/016098, filed on Feb. 16, 2024, which claimed the benefit of U.S. Provisional Patent Application No. 63/485,673, filed on Feb. 17, 2023, and this application further claims the benefit of U.S. Provisional Patent Application No. 63/860,116, filed on Aug. 8, 2025, each of which is hereby incorporated by reference in its entirety.

BACKGROUND

Field

The disclosure of the present patent application relates to animal care, and particularly to an assembly for dispensing fresh water to fowl.

Description of Related Art

Providing a fresh source of water for chickens, ducks, guinea hens and other fowl is a significant concern for many farmers. The simplest method of providing fresh water involves placing buckets, bowls or troughs of water into the pen, brooder or other holding area. This simple approach has been used for many years, but it requires regular flushing, cleaning and re-filling of the bucket, bowl or trough. If the bucket, bowl or trough is not flushed, thoroughly cleaned and re-filled on a regular basis the stagnant water becomes dirty, can be contaminated with fecal matter and can be overrun by bacteria and insects that can transmit serious diseases to the fowl. This is of particular concern for young fowl that are kept and raised in a brooder containing a fresh water source where the young fowl are more likely to soil the water source and are more susceptible to disease. Additionally, buckets, bowls and troughs of water can freeze in cold temperatures requiring a time consuming process of thawing or breaking up the frozen water to give the fowl access to drinkable water.

Some have proposed an article that provides a self-contained water source that can be released through a valve into a common trough when actuated by the fowl. One such device is proposed in U.S. Pat. No. 4,829,933 to Van der Veer and comprises a float operated actuator for a drinking nozzle that is manually actuated to release water into a drinking trough. This approach suffers in that once the water is released to the common trough it can become contaminated with dirt, bacteria and fecal matter.

Others have proposed an article which is completely self-contained and provides water when actuated by the fowl. Articles have existed at least since the 1940's for providing water to fowl through a self-contained system. These systems generally make use of a valve or a series of valves which can be actuated by the fowl to release a flow of water.

For instance, U.S. Pat. No. 2,486,729 to Beckley describes a poultry-watering device comprising a water pipe connected to a low-pressure water supply system with a series of fitted fixtures that are sensitive to the contact of the fowl.

U.S. Pat. No. 3,322,101 to Eagles et al. describes a nozzle having a nipple that is attached to an unknown source of water. An animal contacts the nipple, opening the valve and permitting water to flow out of the valve.

U.S. Pat. No. 3,418,977 to Godshalk describes a poultry watering device comprising a rigid valve body member inserted through a port in an elongated conduit. The fowl pushes upwardly with its beak against the valve to unseat the valve element and permit the flow of water through the valve.

U.S. Pat. No. 4,416,221 to Novey describes a nipple type waterer and valve having an end fitting accessible to an animal with the tip being in the form of a nipple that can be displaced laterally to open the valve.

U.S. Pat. No. 4,984,537 to Steudler, Jr. describes a nipple drinker including a passage, a ball valve which closes the passage when seated and a ball valve actuating stem having a head and a pin. Fowl can actuate a stem to unseat the ball valve to initiate water flow.

U.S. Pat. No. 6,058,881 to Thompson describes a watering valve for birds and small animals having a spring biased metering pin with a tubular actuator stem. The bird or animal applies a demand force to the actuator stem to displace the stem and initiate water flow.

U.S. Pat. No. 6,308,657 to Schumacher et al. describes a drinking valve having a casing, an acceptance part, a connecting part and a snap-in connection.

United States Patent Application No. 2014/0239215 to Cardaropoli discloses an alternative drinking valve with a valve body, an actuating pin, a receiver pin, and a ball.

Thus, a kit and assembly for dispensing fresh water to fowl solving the aforementioned problems are desired.

SUMMARY

The kit and assembly for dispensing fresh water to fowl includes a water reservoir having opposed top and bottom ends and at least one water reservoir sidewall. At least one connector port is formed in the at least one water reservoir sidewall. At least one water distribution arm is provided. The at least one water distribution arm has opposed open and closed ends and at least one water distribution arm sidewall. At least one water distribution port is formed in the at least one water distribution arm sidewall, and at least one drinking valve is received within the at least one water distribution port. The open end of the at least one water distribution arm is releasably connected to, and releasably mated with, the at least one connector port of the water reservoir.

The at least one connector port may include a lug, such an angled lug or a straight lug, as non-limiting examples, for connection to the at least one water distribution arm. The lug may further include a lug stop. Alternatively, the at least one water distribution arm may be provided with a lug. The lug of the at least one water distribution arm may have a lug stop and/or a lug lock. Additionally, a gasket may be provided for forming a seal between the at least one connector port and the at least one water distribution arm.

A water level control mechanism may be provided for controlling the water level within the water reservoir. The water level control mechanism may be attached to the water reservoir. Further, the top end of the water reservoir may be open, and a lid may be provided for releasably covering the open top end of the water reservoir. A mounting bracket may be provided for mounting the water reservoir on a support surface.

In an alternative embodiment, at least one rim may be mounted on the water reservoir about the at least one connector port. The at least one water distribution arm may have at least one clip member for releasably engaging the at least one rim. The at least one clip member may be mounted adjacent to the open end of the at least one water distribution arm. The at least one clip may have an upper clip portion and a lower clip portion, with the upper clip portion having a gap formed therein for releasably receiving a vertically-extending member mounted on an upper edge of the at least one rim. A cap may be provided for removably covering and sealing the at least one connector port.

As a non-limiting example, the water reservoir may have two connector ports, and the water reservoir, a corresponding pair of water distribution arms, each including at least one drinking valve, and the cap may be provided as a kit, thus allowing for the use of both water distribution arms at once, or the use of only one of the water distribution arms, with the other connector port being covered by the cap. The cap may be provided with at least one clip member for releasably engaging one of the rims mounted about one of the connector ports. The kit may also include the lid for the water reservoir and a mounting bracket for mounting the water reservoir on a support surface.

These and other features of the present subject matter will become readily apparent upon further review of the following specification.

BRIEF DESCRIPTION OF DRAWINGS

Similar reference characters denote corresponding features consistently throughout the attached drawings.

DETAILED DESCRIPTION

In this specification and in the claims, the terms "mated to" or "mated with" are synonymous when discussing the threads of one component mated to or mated with the threads of another component. The term "mated to" or "mated with" means that the threads of the two components are appropriately designed in terms of pitch, threads per inch, thread width and thread depth so that the two components are firmly connected with each other meaning that there is no looseness or play when the components are pushed and then pulled in opposing directions. In terms of the art, phrases such as "tight fit", "snug fit", "torqued" and "tightened" can be used to describe when the threads of the two components are mated to or mated with one another.

Male threads are those threads which are on the outer surface of a cylindrical component. Female threads are those threads which are on the inner surface of a cylindrical component. When mated, the outside diameter of the cylinder having the male threads, not including the depth of the male threads, is less than the inside diameter of the cylinder having the female threads, not including the depth of the female threads.

The prior art describes an article 10 for providing fresh water to fowl that is enclosed to prevent contamination of the water supply by dirt, fecal matter or microorganisms thereby eliminating the need for constant flushing, cleaning and refilling of a water source.

Figure 1:
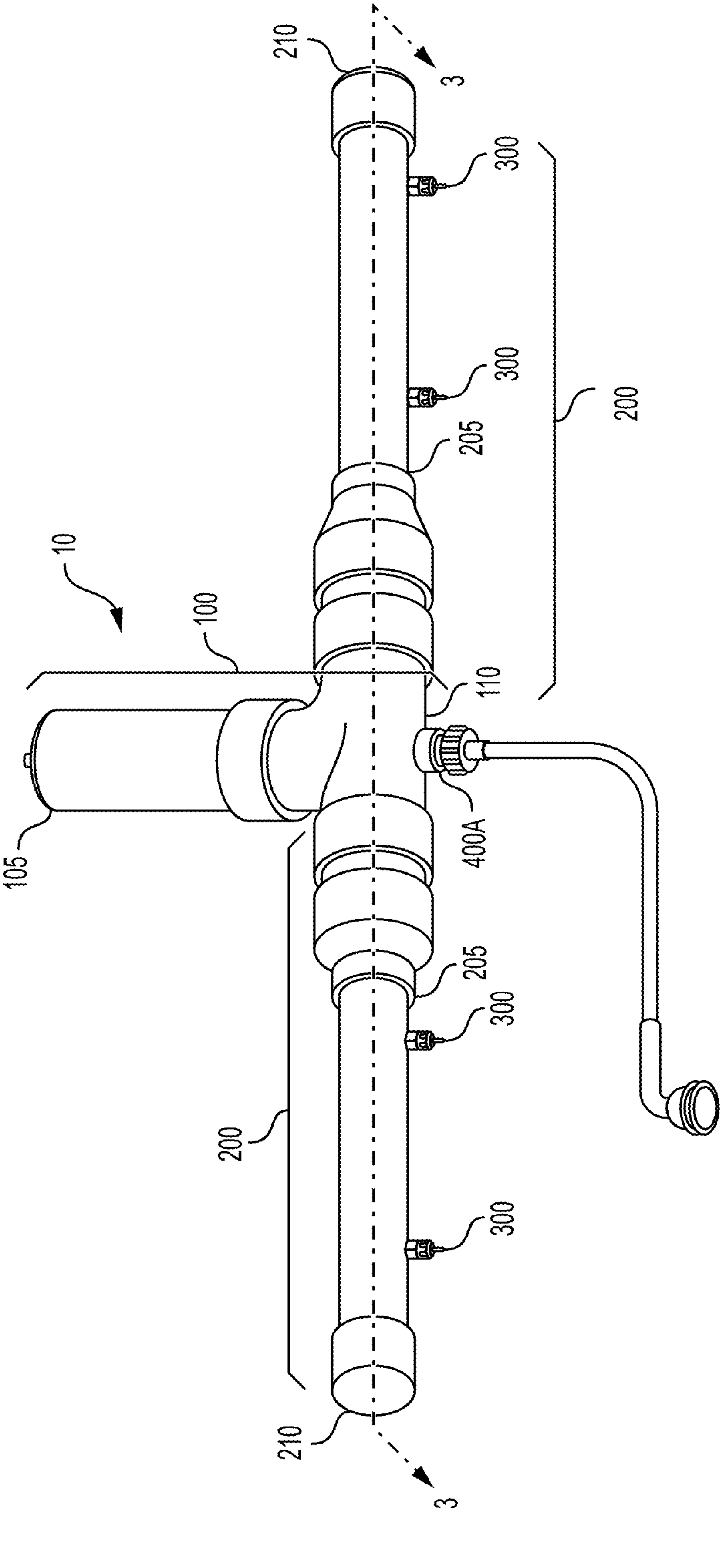
FIG. 1 (PRIOR ART)
FIG. 1 is a perspective view of a prior art embodiment of the article described herein.
Figure 2:
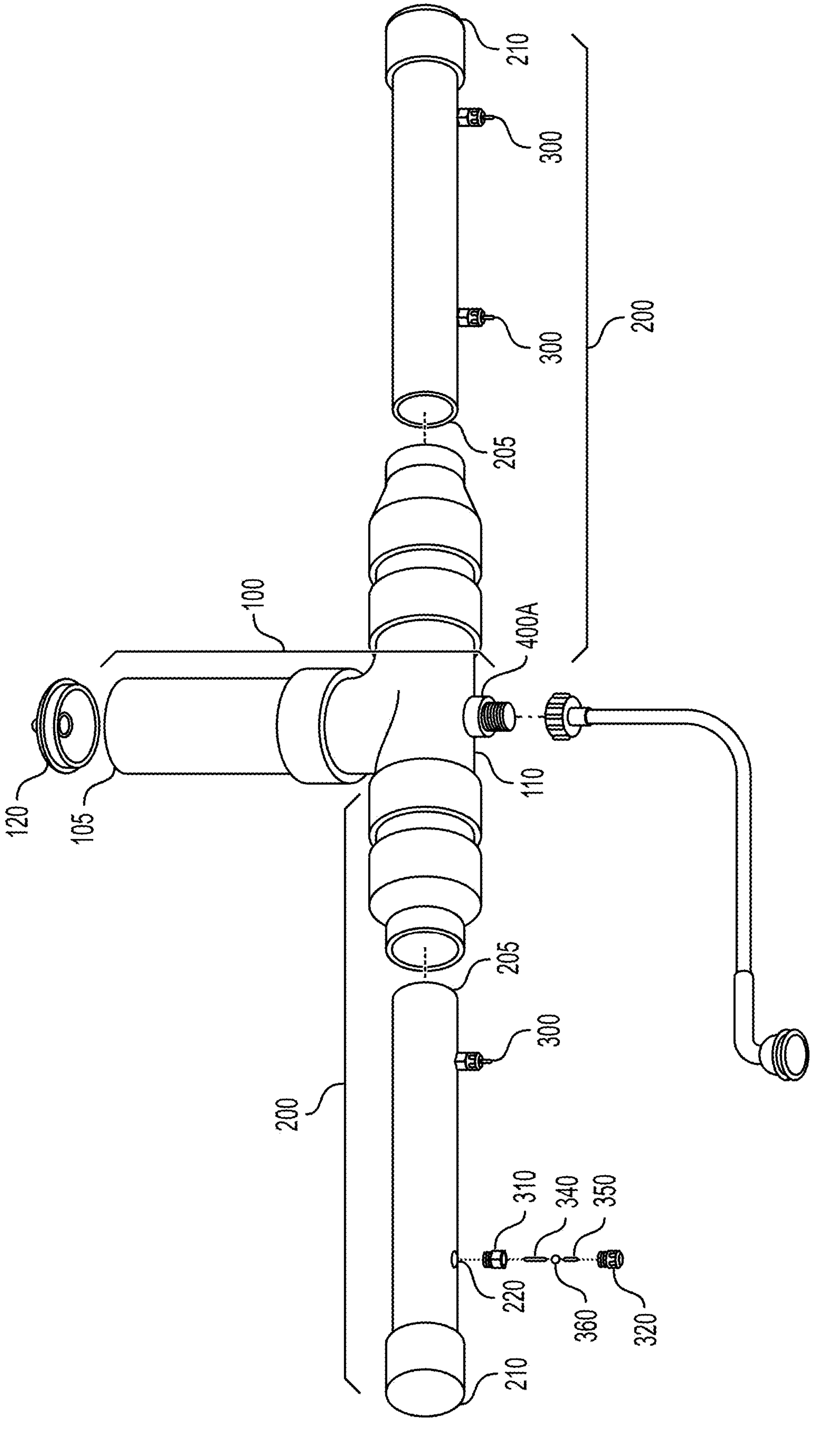
FIG. 2 (PRIOR ART)
FIG. 2 is an exploded view of the prior art embodiment of FIG. 1.
Figure 3:
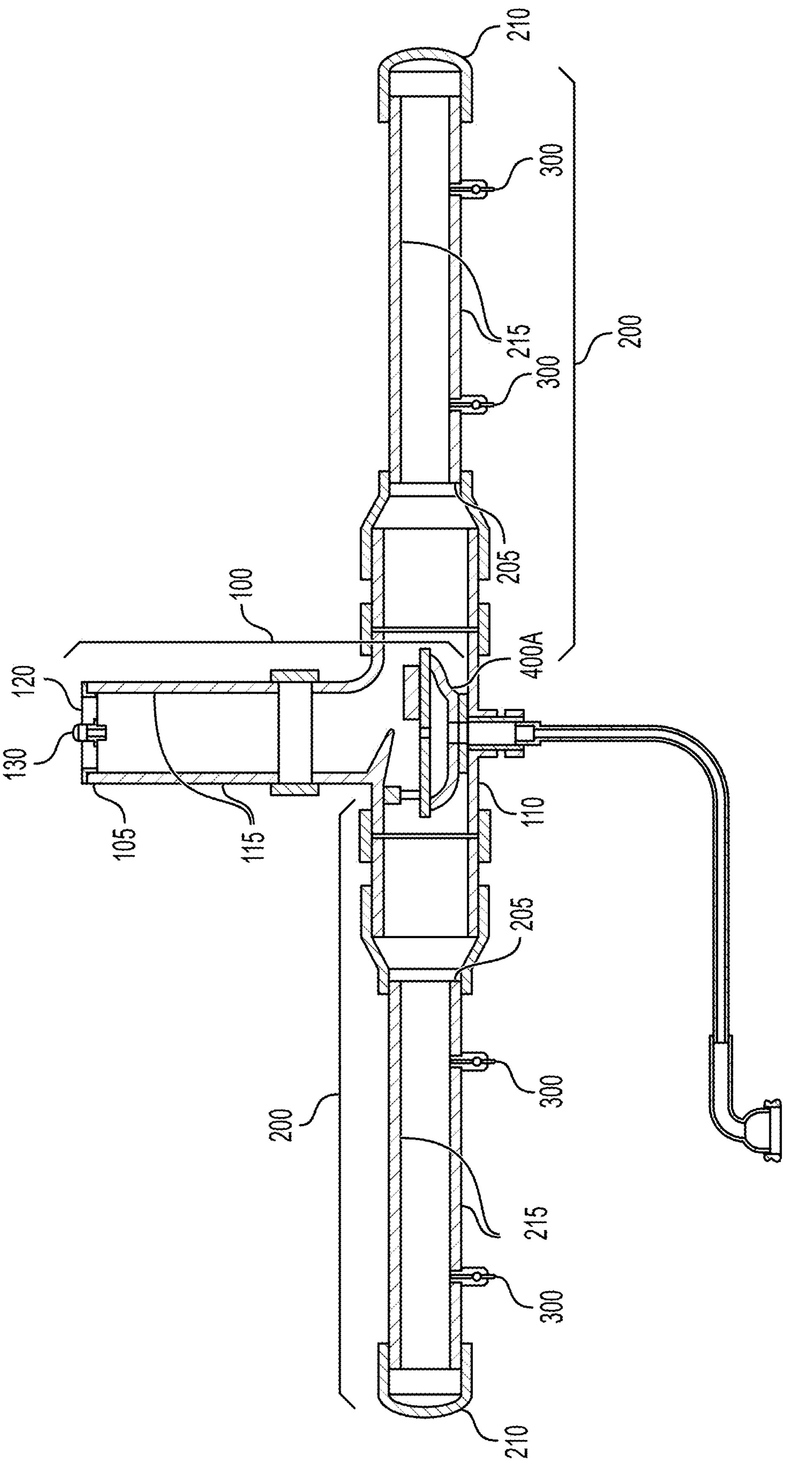
FIG. 3 (PRIOR ART)
FIG. 3 is a cut away view the prior art embodiment of FIG. 1.

FIG. 1 depicts one embodiment of a prior art article for providing fresh water to fowl disclosed in this specification comprising a water reservoir 100, at least one distribution arm 200 comprising at least one drinking valve 300, and a water level control mechanism 400A. As shown in FIG. 2, the prior art water reservoir comprises a top end 105, a bottom end 110, at least one sidewall, and a cap 120. As shown in FIG. 3, the at least one sidewall 115 has a length dimension, a width dimension, an inner surface and an outer surface defining the exterior shape of the water reservoir. The exterior shape of the water reservoir is not considered to be important. In one embodiment, the water reservoir has a cylindrical shape wherein there is a single sidewall running continuously in a circular or oval pattern. In another embodiment the water reservoir may have a rectangular, triangular, trapezoidal, hexagonal or octagonal shape wherein there are multiple sidewalls and the sidewalls are attached on their longitudinal edges to form the desired shape. In either event, the at least one sidewall provides for a water reservoir having a hollow interior running from the water reservoir top end to the water reservoir bottom end.

The prior art cap 120 is adapted to cover the water reservoir top end 105. The cap may be designed such that at least a portion of the cap fits inside the hollow interior of the water reservoir as shown in FIG. 2. In such an embodiment, the portion of the cap that fits inside the water reservoir is of similar shape and dimension as the inner surface of the at least one sidewall. The cap may also be threaded into the water reservoir top end. In such an embodiment the inner surface of the at least one sidewall has female threads at the water reservoir top end, the portion of the cap that fits inside the hollow interior of the water reservoir has male threads and the male threads of the cap are mated to the female threads of the at least one sidewall.

Figure 13:
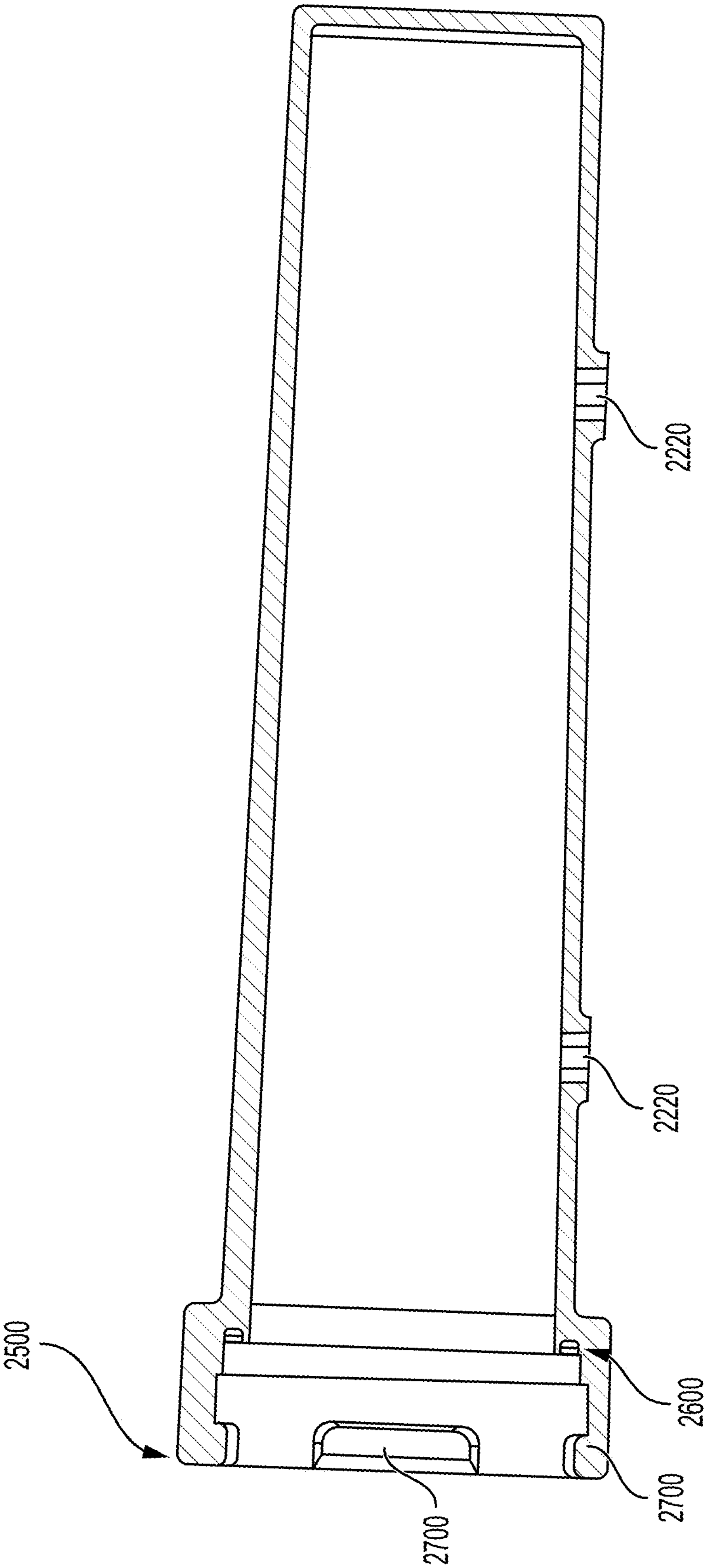
FIG. 13 is a cutaway of a distribution arm.

In one embodiment the cap 120 further comprises a vent 130 as shown in FIG. 3. One preferred vent is an inverted ball check valve having a first end, a second end, a hollow interior, and a ball. When the vent is closed, the ball closes the vent such that air, liquids, and solid debris cannot enter the water reservoir and air and water cannot exit the water reservoir. When pressure in the water reservoir increases at the water reservoir top end, the ball is forced out of the ball seat thereby allowing air and/or water to exit the water reservoir. This is particularly useful during the process of filling the water reservoir. If air and/or water are not allowed to exit the water reservoir through the vent, pressure will build in the water reservoir during filling which may result in the cap being dislodged. One such inverted ball check valve is a modified form of the preferred embodiment of the drinking valve described below and shown in FIG. 13 where the receiver pin and the actuator pin of the preferred drinking valve are removed.

The prior art's at least one distribution arm extends past the water reservoir sidewall. As shown in FIG. 2, the at least one distribution arm 200 comprises a first end 205, a second end 210, at least one sidewall and at least one drinking valve 300. As shown in FIG. 3, the at least one sidewall 215 has a length dimension, a width dimension, an inner surface and an outer surface defining the exterior shape of the distribution arm. The prior art did not consider the exterior shape of the at least one distribution arm is not considered to be important except that the exterior shape of the at least one distribution arm should be such that the at least one distribution arm can be connected to the water reservoir 100 in a manner such that the connection between the at least one distribution arm and the water reservoir creates a water-tight seal at standard atmospheric conditions—sea level, 25 °C.

In this prior art embodiment, the at least one distribution arm has a cylindrical shape wherein there is a single sidewall running continuously in a circular or oval pattern. The at least one sidewall provides for an at least one distribution arm having a hollow interior running from the distribution arm first end to the distribution arm second end.

In the prior art embodiment of FIG. 3, a first portion of the at least one distribution arm is joined in a unitary manner to the water reservoir sidewall at the water reservoir sidewall bottom end. A second portion of the at least one distribution arm is not joined in a unitary manner to the water reservoir. The first portion of the at least one distribution arm is connected to the second portion of the at least one distribution arm such that the connection creates a water-tight seal.

In one prior art embodiment, the water-tight seal may be created by closely matching the shape and size of the two portions of the distribution arm and bonding them using a sealant material such as silicone, PVC cement, or both. One preferred PVC cement is Medium-Clear PVC Cement #31017 available from Oatey of Cleveland, Ohio, USA.

The at least one distribution arm is preferably sealed at the end which is not attached or joined in a unitary manner to the water reservoir. In the prior art embodiment of FIG. 3, the seal is a cap (210) that fits around the outer surface of the distribution arm sidewall is of similar shape and dimension as the outer surface of the at least one sidewall.

The drinking valve 300 can be any drinking valve known in the art and those yet to be invented. Examples of drinking valves considered useful for the current invention include those disclosed in U.S. Pat. No. 3,322,101 to Eagles et al., U.S. Pat. No. 3,418,977 to Godshalk, U.S. Pat. No. 4,416,221 to Novey, U.S. Pat. No. 4,984,537 to Steudler, Jr., U.S. Pat. No. 6,058,881 to Thompson and U.S. Pat. No. 6,308,657 to Shumacher et al., the teachings of each of which are incorporated herein by reference. It is preferred that the drinking valve not be of a design which requires a squeezing force to actuate the flow of water, such as a baby bottle nipple. Preferably the drinking valve has a self-sealing actuating mechanism which opens the drinking valve when an actuating force is applied to the actuating mechanism and automatically closes the drinking valve when the actuating force is released. Examples of such an actuating mechanism are disclosed in U.S. Pat. No. 4,984,537 to Steudler, Jr. having a ball valve closing the passage when seated on at least one valve seat, and a ball valve actuating stem having a head and a pin, whereby small and large fowl and/or animals can actuate the stem to unseat the ball valve in proportion to the force applied to the stem.

The drinking valve 300 may be attached to the distribution arm 200 in a number of manners. In one embodiment, the distribution arm comprises at least one valve hole 220 having female threads while the outer surface of the drinking valve has male threads and the drinking valve male threads are mated to the at least one valve hole female threads. In another embodiment, the distribution arm comprises a male protrusion having male threads that is attached to the distribution arm sidewall outer surface and protrudes outwardly therefrom. In such an embodiment the inner surface of the drinking valve has female threads and the drinking valve female threads are mated to the at least one male protrusion male threads. In another embodiment, a portion of the drinking valve is joined to the at least one distribution arm in a unitary manner such as by injection molding.

In a preferred embodiment, the drinking valve 300 has a receiver 310, a valve cap 320, and an actuating mechanism.

An actuating mechanism is the specific valve configuration and components which allows the flow of water to be turned on and off. In one embodiment shown in FIG. 13 the actuating mechanism comprises a receiver pin 340, an actuating pin 350 and a ball 360.

In the preferred drinking valve embodiment, the receiver 310 has a first end, a second end and a receiver hole having a receiver hole diameter. The receiver hole passes through the receiver from the receiver first end to the receiver second end. In one embodiment the receiver hole has a first receiver hole diameter at the receiver first end and a second receiver hole diameter at the receiver second end where the second receiver hole diameter is greater than the first receiver hole diameter.

In one embodiment of the preferred drinking valve the inner surface of the receiver hole has female threads at the receiver second end. In another embodiment of the preferred valve, the outer surface of the receiver second end has male threads. The receiver hole further comprises a receiver pin seat having a receiver pin seat diameter. The receiver pin seat acts as a stop to prevent the receiver pin from advancing further into the receiver. The receiver may further comprise a gasket ridge in which a gasket or O-ring may be seated.

The receiver 310 may be attached to the distribution arm 200 in a number of different manners. In one embodiment, the distribution arm comprises at least one valve hole 220 having female threads while the outer surface of the receiver first end has male threads and the receiver first end male threads are mated to the at least one valve hole female threads. In another embodiment, the distribution arm comprises a male protrusion having male threads that is attached to the distribution arm sidewall outer surface and protrudes outwardly therefrom. In such an embodiment the inner surface of the receiver first end has female threads and the receiver first end female threads are mated to the at least one male protrusion male threads. In another embodiment, the receiver is joined to the at least one distribution arm in a unitary manner such as by injection molding.

Because the water is self-contained in the reservoir and the drinking arm it is less susceptible to being contaminated with dirt, fecal matter or bacteria. In a preferred embodiment, the water flowing from the drinking valve does not drip into a common bowl or trough and in fact the preferred method for watering the fowl is to do so in the absence of a common bowl or trough which may or may not be attached to the assembled article. Accordingly, the supply of water for the fowl will remain fresh without the need to continually flush, clean and re-fill a bucket, bowl or trough.

Each distribution arm 200 may comprise one or more than one drinking valve 300. The number of drinking valves connected to each distribution arm is not considered important. One of ordinary skill in the art will recognize that the number of drinking valves per distribution arm and the number of distribution arms can be varied according to the number of animals that are obtaining water from the device. In the prior art embodiment, each of the drinking valves is attached to the distribution arm such that each drinking valve is substantially perpendicular to the ground. In an alternative non-prior art embodiment (FIG. 19) the drinking valves may be attached to the distribution arm at a plurality of angles in the range of about 1° from perpendicular to the ground to about 45° from perpendicular to the ground.

In a preferred embodiment the valve cap 320 is red. In a more preferred embodiment the valve cap and the receiver 310 are red. In an even more preferred embodiment, the valve cap and receiver are red and the distribution arm 200 is white. The coloring may be achieved by using materials which are inherently red or white, adding a colorant to the composition used to make that portion of the article or painting or layering a colored material onto that portion of the article. It is believed that the red color draws the fowl with the preferred contrasting red and white colors of the distribution arm and the receiver/valve cap best attracting the fowl to the apparatus making it more likely that they will drink from the apparatus.

It is preferred that the water reservoir 100, the distribution arm 200, the receiver 310 and the valve cap 320 comprise a plastic material. Preferred plastics for use in the water reservoir, the distribution arm, the receiver and the valve cap include polyvinyl chloride, foamed polyvinyl chloride, polyethylenes, foamed polyethylenes, and combinations thereof.

The water level control mechanism 400A or 400B is any device that regulates the hydrostatic pressure applied to the drinking valve 300 based upon the amount of water in the device when the drinking valve is in the closed position. If too much water is contained in the device, the hydrostatic pressure that is applied to the drinking valve may make it difficult for the fowl to open the drinking valve and obtain water. Conversely, if not enough water is contained in the device, the hydrostatic pressure applied to the drinking valve may be such that the valve can be opened too easily, thereby allowing water to spill from the valve and become wasted. One of ordinary skill in the art will recognize that the water level control mechanism serves the dual purpose of controlling the water level in the device as well as the hydrostatic pressure at the drinking valves. The water pressure at the drinking valves is a function of the number of drinking valves and the water level in the device. Accordingly, as more drinking valves are added to the device, the water level should be increased to ensure that adequate pressure is kept at each drinking valve. Preferably the water level control mechanism is an anti-siphon fill valve.

In the prior art embodiment shown in FIGS. 1 to 3, the water level control mechanism is a floatless ballcock fill valve 400A. One such floatless ballcock fill valve is a K830-15 Mini Pilot Anti-Siphon Toilet Fill Valve available from The Keeney Manufacturing Company, Newington, Connecticut, USA. The floatless ballcock fill valve is located at the bottom end of the water reservoir 110. The bottom end of the water reservoir will have a fill valve hole to allow the floatless ballcock fill valve to be attached to an external water source. The floatless ballcock fill valve includes a diaphragm pressure sensing mechanism that opens the fill valve when the hydrostatic pressure in the water reservoir decreases beyond a pre-determined level thereby refilling the water reservoir and increasing the hydrostatic pressure applied to the drinking valve to the desired level. The floatless ballcock fill valve may also include a fill hose which extends out from the floatless ballcock fill valve and into one of the plurality of distribution arms.

Figure 4:
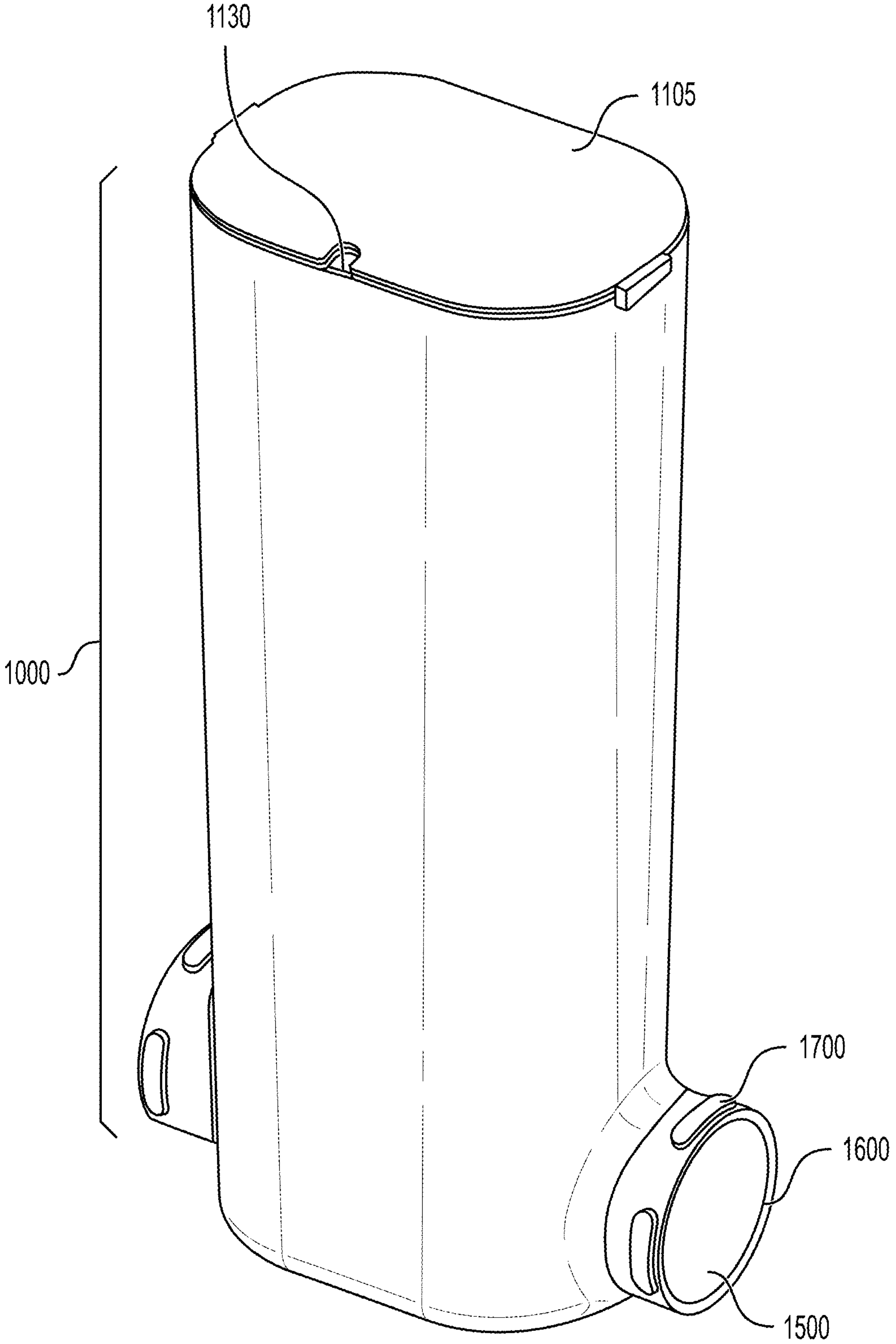
FIG. 4 is a perspective view of the body of the invented water dispenser.
Figure 5:
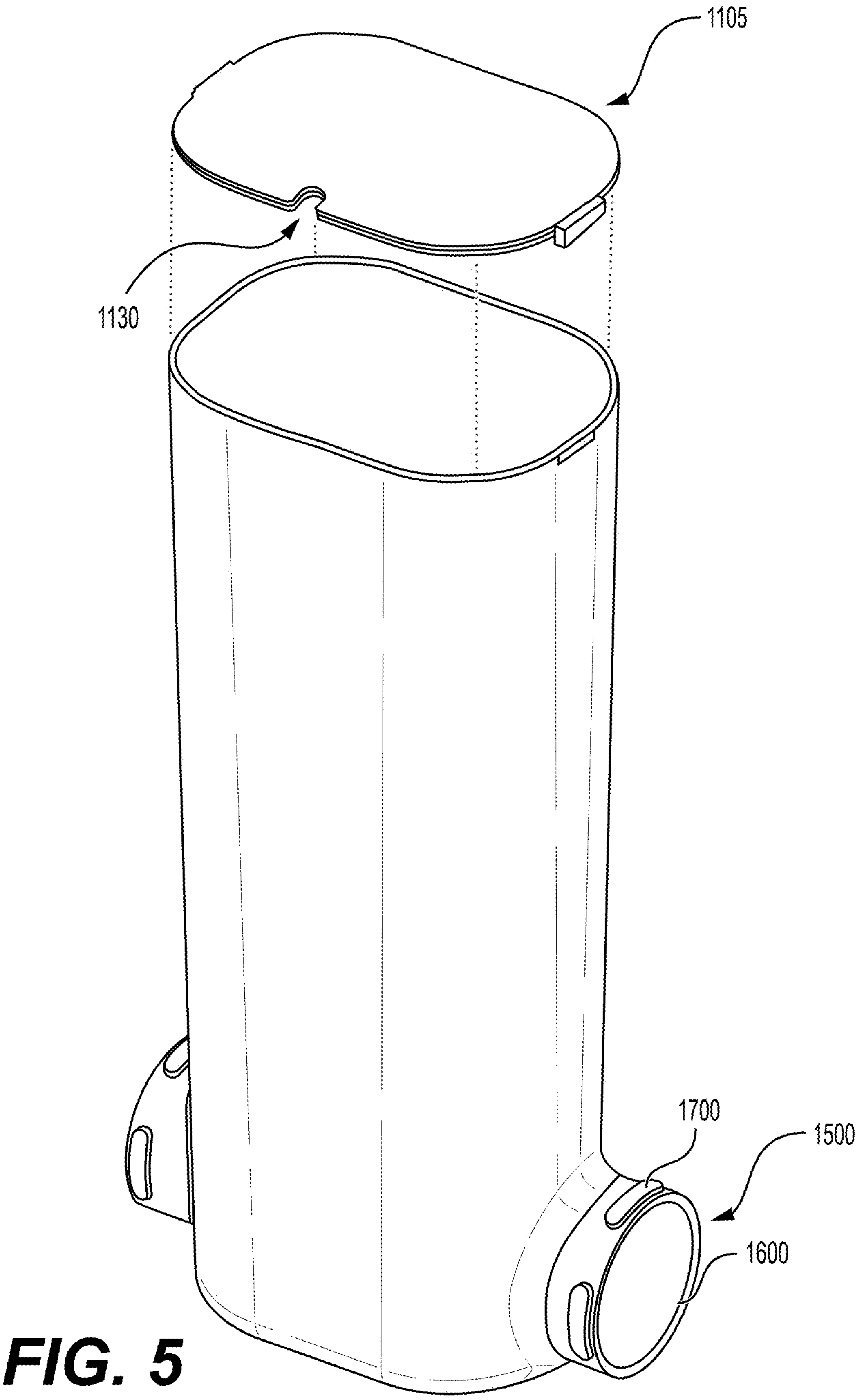
FIG. 5 is an exploded view of the perspective view of the invented water dispenser.
Figure 6:
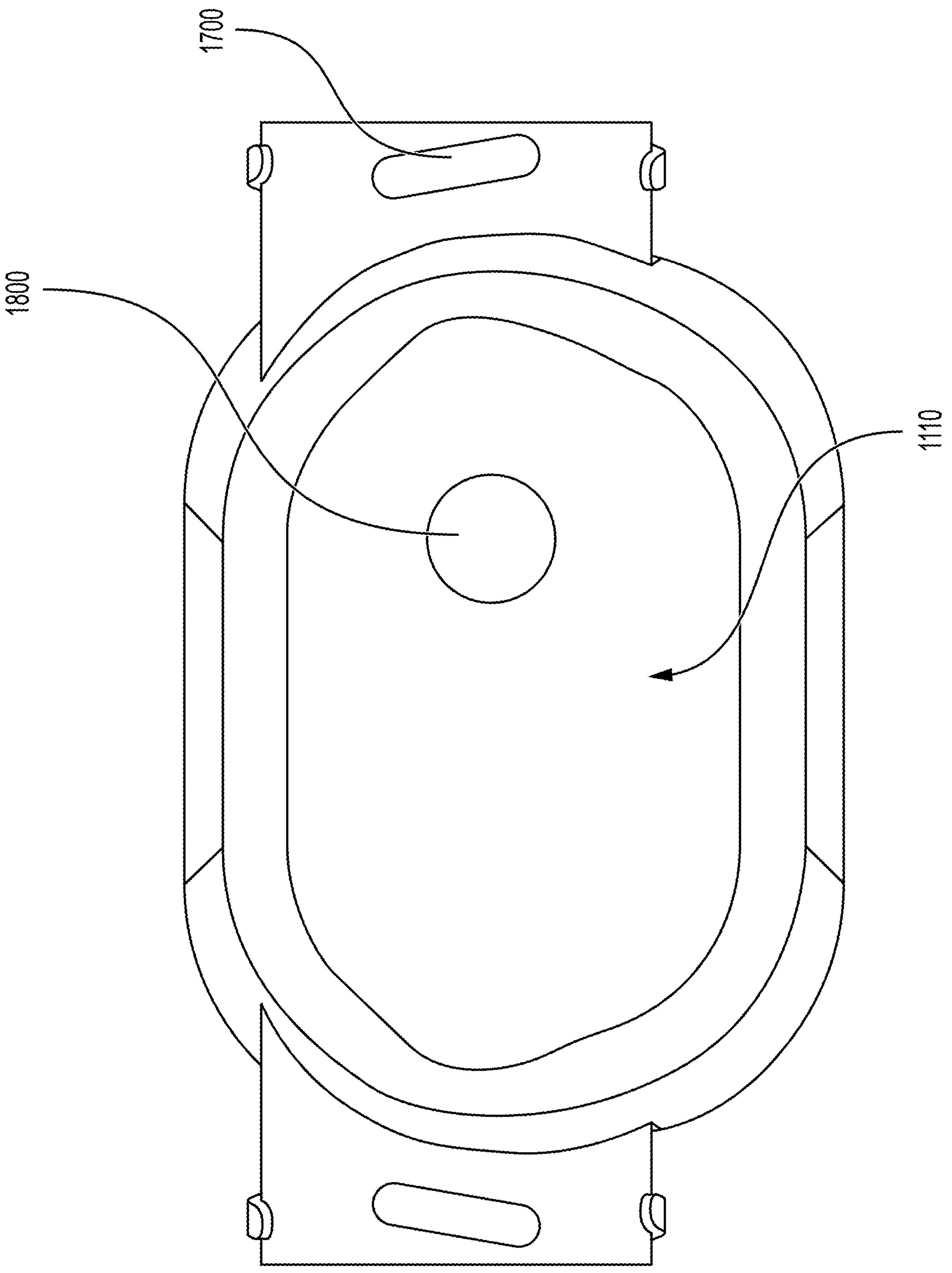
FIG. 6 is a bottom view of an embodiment of the water dispenser.

In the non-prior art embodiment shown in FIGS. 4 to 6, the device is similar to the prior art water dispensing device discussed above, but the water level control mechanism is a float fill valve 400B. One preferred float fill valve is a Kerick Float Valve M052 available from Kerick Valve, Inc., Jacksonville, Florida, USA. The float valve is located at the top end of the water reservoir 105. The sidewall of the water reservoir will have a fill valve hole located near the top end of the water reservoir to allow the float fill valve to be attached to an external water source. The float fill valve includes a float that closes the fill valve when the water level in the water reservoir is at the level desired to maintain the appropriate hydrostatic pressure and opens the fill valve when the water level in the water reservoir falls below the desired level. Accordingly, by automatically re-filling the water reservoir, the drinking valves will always have the appropriate amount of hydrostatic pressure applied to them when they are in the closed position.

In one embodiment, the external water source is a hose attached to a traditional water spigot. The water spigot can be attached to the main water supply for a residential, agricultural or industrial establishment such as a well water source or a municipal water system. The water spigot can remain open and the water level control mechanism will regulate the amount of water that flows out of the spigot into the water reservoir. In embodiments using a float fill valve and a traditional water spigot, the system may be adapted to withstand the high pressure (greater than 5 psi) of the water entering the water reservoir from the traditional water spigot. Traditionally this can be achieved by adapting the type of the feeder hose and valve fittings.

In another embodiment the external water source is a tank 500, which could be a barrel, a bucket, a pail, or other vessel, comprising a bottom surface, at least one sidewall and a top surface. The top surface may be a solid unitary surface, (i.e. covered), it may be a screened surface or it may be open to the atmosphere. A screened surface is preferred in order to allow rain water to collect in the tank while simultaneously preventing contaminants, particularly mosquitos, ants, flies, bees, larvae, and other insects from contaminating the water supply. Preferably the screened surface comprises a screen having a screen mesh size to exclude even the "no see um" or biting midges. This screen size is typically no larger than 30 mesh, with no larger than 25 mesh being preferred and no larger than 20 mesh being a most preferred size. One preferred screen is white Noseeum Mosquito Netting Fabric from the Online Fabric Store, at http://www.onlinefabricstore.net/white-noseeum-mosquito-netting-fabric-.htm, 12 May 2014.

Allowing rain water to collect in the tank reduces or eliminates the need to continuously re-fill the tank. The water reservoir may be connected directly to the tank by a series of fittings or hoses. Preferably, the water reservoir is connected to the tank by a hose. In one embodiment the hose runs from the bottom surface of the tank and a float fill valve attached to the sidewall of the water reservoir. In another embodiment, the hose runs from the bottom surface of the tank and a floatless ballcock fill valve attached to the bottom end of the water reservoir. In still another embodiment, one end of the hose is inserted into the tank through the tank top surface and the other end of the hose is inserted into the top end of the water reservoir. The portion of the hose that is not inserted into the top end of the water reservoir or the top of the tank is maintained at a height above the top surface of the tank and the top end of the water reservoir so that water may be siphoned out of the tank, through the hose and into the water reservoir without the need for a fill valve.

The arrangement of the tank to the water reservoir should be such that the water will flow from the tank to the water reservoir without external assistance such as a pressurized water source, increased air pressure, a pump, or other water conveying device. For example, placing the tank above the water reservoir relative to the ground allows the water to flow via gravity from the tank into the water reservoir when the at least one drinking valve is open. Locating the tank below the water reservoir requires use of the siphoning principles well understood in the art. The drawback of siphoning is that, if the water tank is ever empty, the siphon is broken and needs to be restarted.

In this manner, the watering system is mobile and can be located in any outdoor field far away from a pressurized water source. It is even conceived that a solar powered water pump could be used to deliver a low amount of water from a nearby stream, thus keeping the tank filled with water and supplying the water reservoir via the water level control mechanism to maintain a relatively constant pressure at the at least one drinking valve.

It is preferred that the assembly provides a barrier against visible light and its outside ranges defined as light in the range of 350 nm to 750 nm that can reach the water. The visible light and its outside ranges foster the growth of photosynthetic organisms, such as algae, in the water supply. These photosynthetic organisms can cause health problems for the animals. In this regard, it is preferred that the water be entirely enclosed from the visible light and that the various components, including the water reservoir, the cap, the distribution arm, and the valves be made of materials which block the visible light and its outside ranges from passing through the component. Blocking visible light and its outside ranges means that at least 50% of the light in the range of 350 nm to 750 nm does not pass through the component, with at least 75% being more preferred, and 85% being even more preferred, and 95% being more preferred with 100% being the most preferred. 50% of the light means 50% of the total light, not 50% of each wavelength. This can be done by using inherently opaque materials, using inherently properly colored materials, adding an additive which blocks or absorbs the light, or painting or layering a colored material onto that portion of the article so that it blocks the visible light and its outside ranges.

In one embodiment, the assembly further comprises an electric heater. The electric heater comprises a source of electricity and a heating element. One example of an electric heater is a 44 Watt foil heater. The 44 Watt foil heater comprises a heater plug which extends out of the reservoir and can be connected to a standard electric outlet. In one embodiment the heating element extends into the water reservoir. In a further embodiment the heating element extends into the at least one distribution arm. In still a further embodiment the heating element extends into both the water reservoir and the at least one distribution arm. The heating element preferably has a thermal conductivity greater than 50 Btu/(hr·°F·ft) at 68 °F. In a more preferred embodiment the heating element has a thermal conductivity greater than 100 Btu/(hr·°F·ft) at 68 °F. In a most preferred embodiment the heating element has a thermal conductivity greater than 150 Btu/(hr·°F·ft) at 68 °F.

In one preferred embodiment the heating element comprises copper, with the heating element preferably comprising more than 90% copper by weight with the heating element comprising more than 99% by weight copper being more preferred and a heating element made of 100% copper by weight being most preferred. The heating element may also be considered to consist essentially of copper, meaning that there could be trace amounts of other materials including copper oxide. In another preferred embodiment, the heating element comprises more than 90% silver by weight with the heating element comprising more than 99% by weight silver being more preferred and a heating element made of 100% silver by weight being most preferred. The heating element may also be considered to consist essentially of silver, meaning that there could be trace amounts of other materials including silver oxide. In another preferred embodiment the heating element is silver coated, an example of which is a core comprising copper with a silver coating, wherein the amount by weight of silver in the coating to the amount of copper in the core is in the range of 0.001 to 0.1, with 0.001 to 0.01 the most preferred. Since the amount of the silver may also be 0, in the case of just the heating element, the heating element may have the amount by weight of silver in the coating to the amount of copper in the core is less than 0.1, with less than 0.01 the most preferred.

In one preferred embodiment the assembly comprises a heating element which extends into the at least one distribution arm used in conjunction with a plurality of drinking valves wherein at least one drinking valve comprises a heat transfer pin of the specifications and compositions described earlier. Preferably each drinking valve of the plurality of drinking valves comprises a heat transfer pin. In such an embodiment it is preferred that the heating element be silver coated. It is further preferred that the heat transfer pin comprises greater than 90% copper by weight. In one embodiment the heat transfer pin may be silver coated. In one embodiment the heating element is in direct contact with the heat transfer pin of each of the plurality of drinking valves. In this manner, the heat from the electric heater heats the water in the distribution arm and the heat transfer pin moves the heat from the distribution arm into the drinking valve which delays or prevents the valve from freezing.

The prior art embodiments, such as the one shown in FIGS. 1 to 3, suffered from difficult construction and the use of various liquid sealants that were difficult to apply or were shipped with the parts to be assembled by the end user. The backyard chicken farmer is one who desires a kit for easy assemble which requires little or no effort to assemble. Thus, the inventors have created such an easy to assemble kit which is void of chemical sealants and can be assembled by hand.

FIGS. 4 to 13 show an improved assembly and kit for assembly comprising a water receiver 1100 with an optional lid 1105 and vent 1130. The illustrated improved water receiver is of unitary construction and has two connector ports, one of which is shown as 1500 in FIG. 5. Unlike the prior art connection to the distribution arm which contained four components (water receiver, union, reducer, and tube), sealed with PVC adhesive, the improved connection is provided by at least two lugs which angle away from the open end of the connector port. Shown as 1700 in FIG. 5, these lugs are located on the outside of the rounded connector wall. In another embodiment, they could be located on the inside of the distribution arm that connects with the connector port. 1600 represents a groove or concave portion for a seal, like an O-ring or a gasket. When the distribution arm is rotated in connection with the lugs, the lug guides a groove in the distribution arm and tightens, also known as applying pressure to, the seal between the connector port and the distribution arm. This compression applies the pressure indicated in the direction of the arrow 1650.

An alternate embodiment is to have a thread circumscribing the circumference of the connector port. The difference between a lug and a thread is that the thread is a continuous tracing around the connector port many times whereas the lug is discontinuous and the distribution arm only travels a portion around the connector, thus controlling the amount of torque or pressure put on the seal.

The distribution arm labeled 2000 (FIGS. 11 to 13) has at least one distribution port 2220 which is a hole the wall of the distribution arm and receives the drinking valve which is not shown in the figures, but is fully described and known in the prior art. 2500 is the first end of the distribution arm opposite the second end, which is closed off preventing water flow. The first end has a connecting lug 2700 and a seal groove 2600 for holding the O-ring or seal to be compressed as the distribution arm is twisted around the connector port and tightened.

The cap may also be threaded onto the distribution arm sidewall. In such an embodiment the outer surface of the distribution arm sidewall may have male threads while the portion of the distribution arm cap that fits around the outer surface of the distribution arm sidewall has female threads and the male threads of the distribution arm sidewall are mated to the female threads of the distribution arm cap. In an alternative embodiment the distribution arm cap is bonded to the distribution arm using a sealant material such as silicone, PVC cement, or both.

Figure 14:
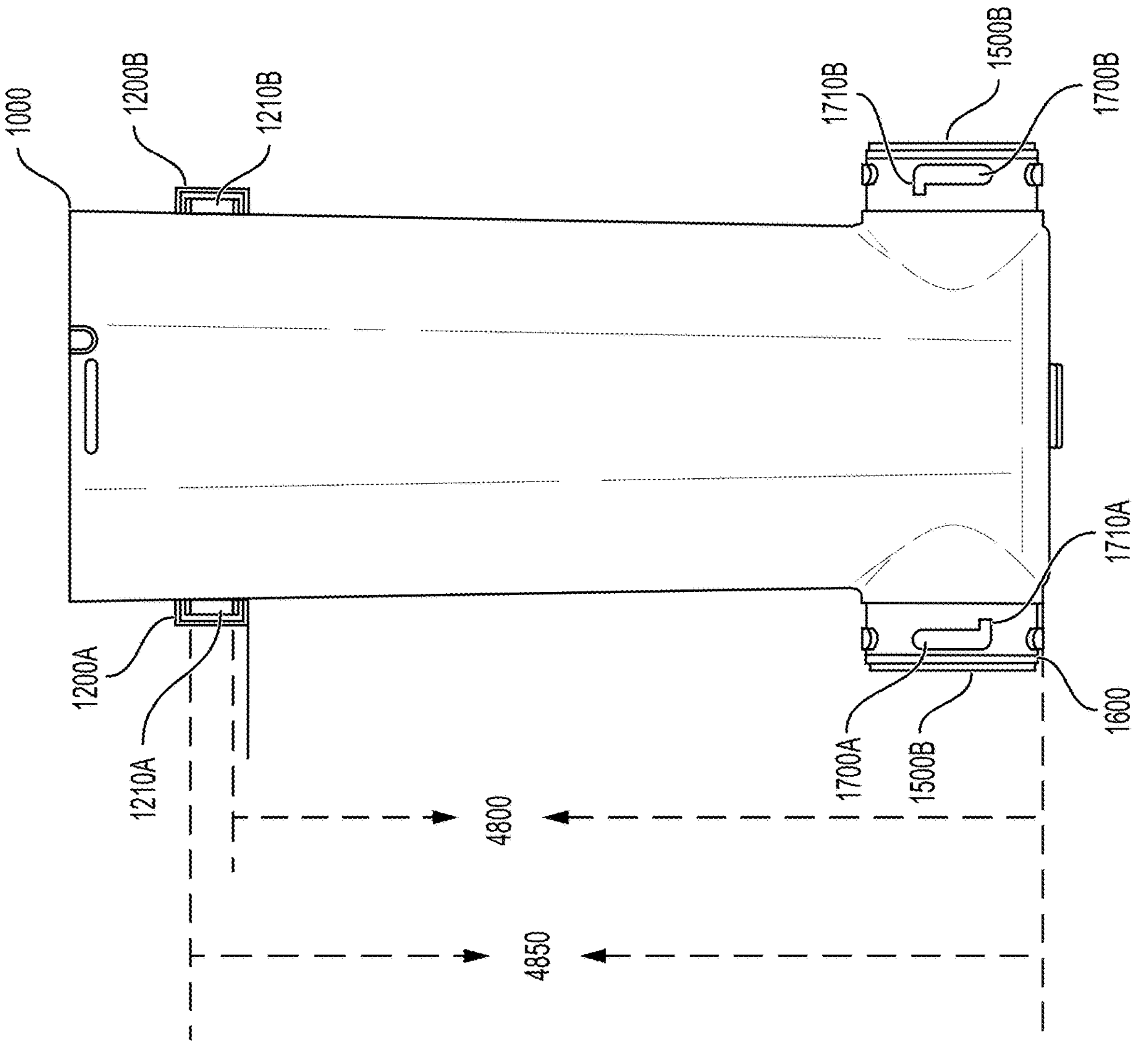
FIG. 14 is a side view of an alternative embodiment of the water dispenser.
Figure 15:
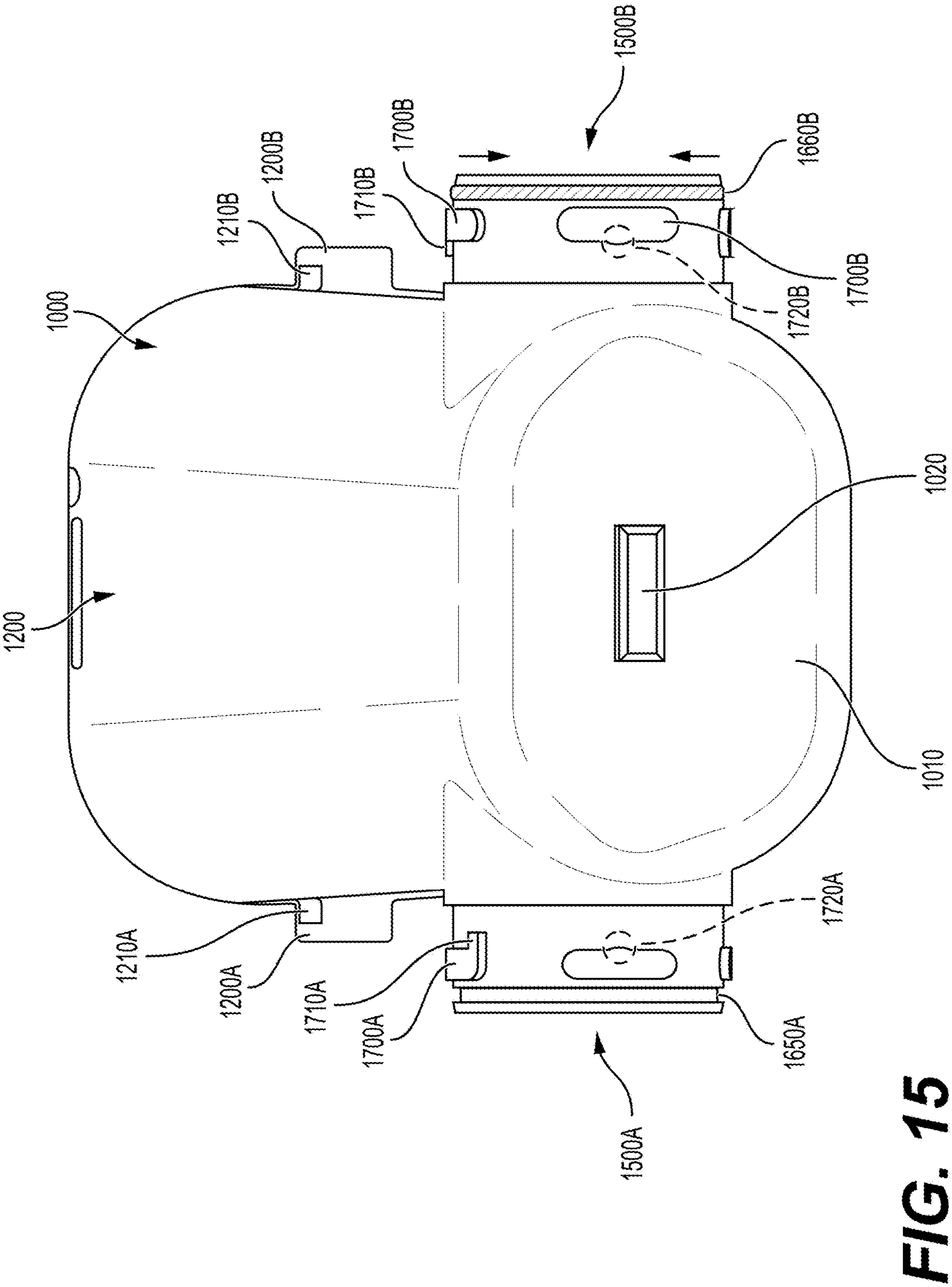
FIG. 15 is a bottom perspective view of an alternative embodiment of the water dispenser.
Figure 16:
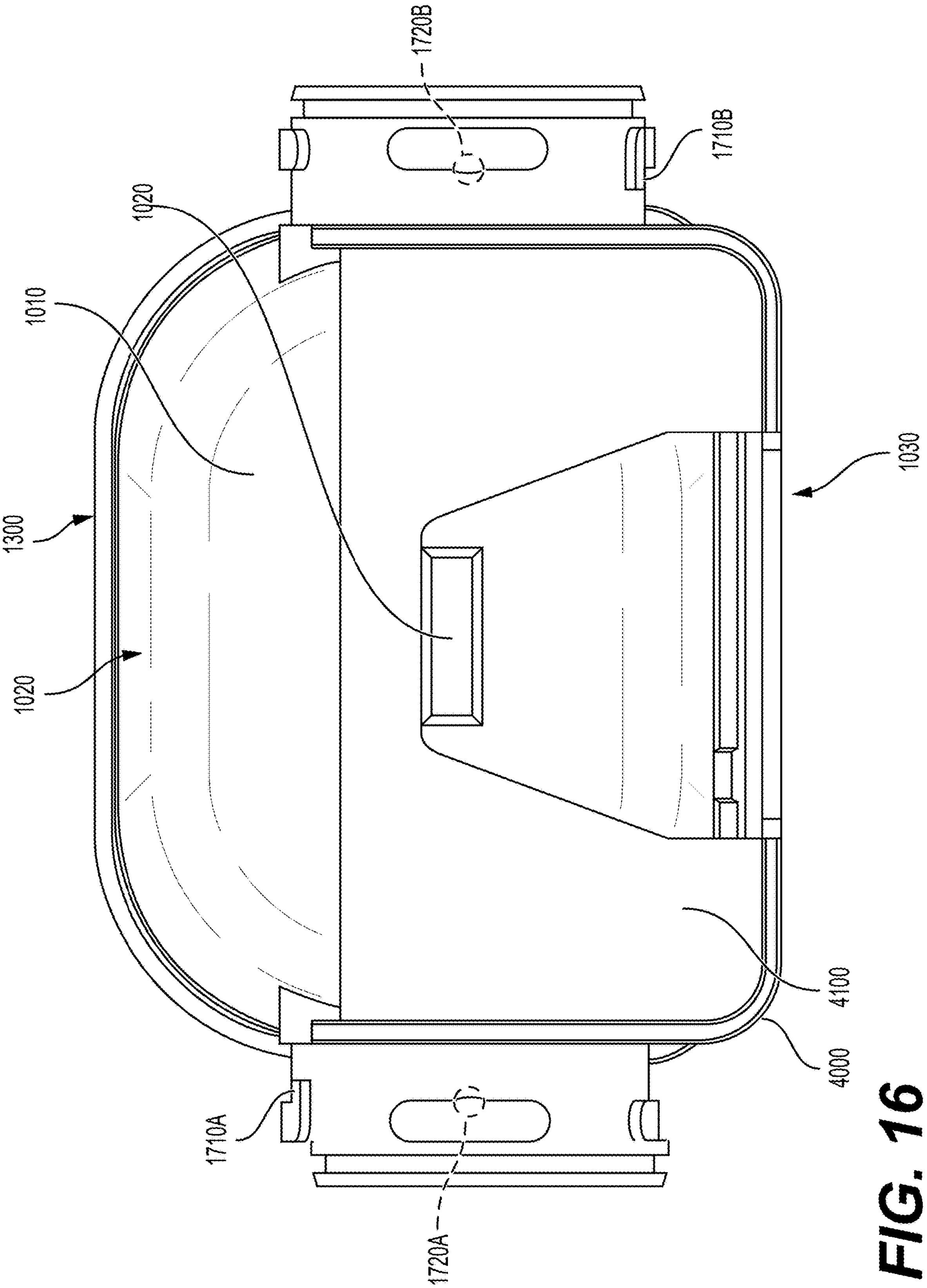
FIG. 16 is a bottom view of an alternative embodiment of the water dispenser.

FIGS. 14 to 28 show embodiments of a straight lug design, a lug stop design, and a lug lock design. Also shown is a wall mount with brackets attached to the reservoir. FIGS. 14 to 16 the straight lug design 1700. Instead of angling around the port, the lugs are straight, i.e. Parallel with the port inlet. The angle is not needed due to the placement of O-ring groove (FIG. 15; 1650A, 1650B) around the respective port 1500A and 1500B. The O-ring placement is shown in (FIG. 15, with only 1660B shown). Where the angled lug compresses the O-ring against the port in the tightening direction is shown in the bi-directional arrows in FIG. 7, the O-ring with the straight lug is compressed towards the center of the port as shown in the arrows in FIG. 15.

Figure 18:
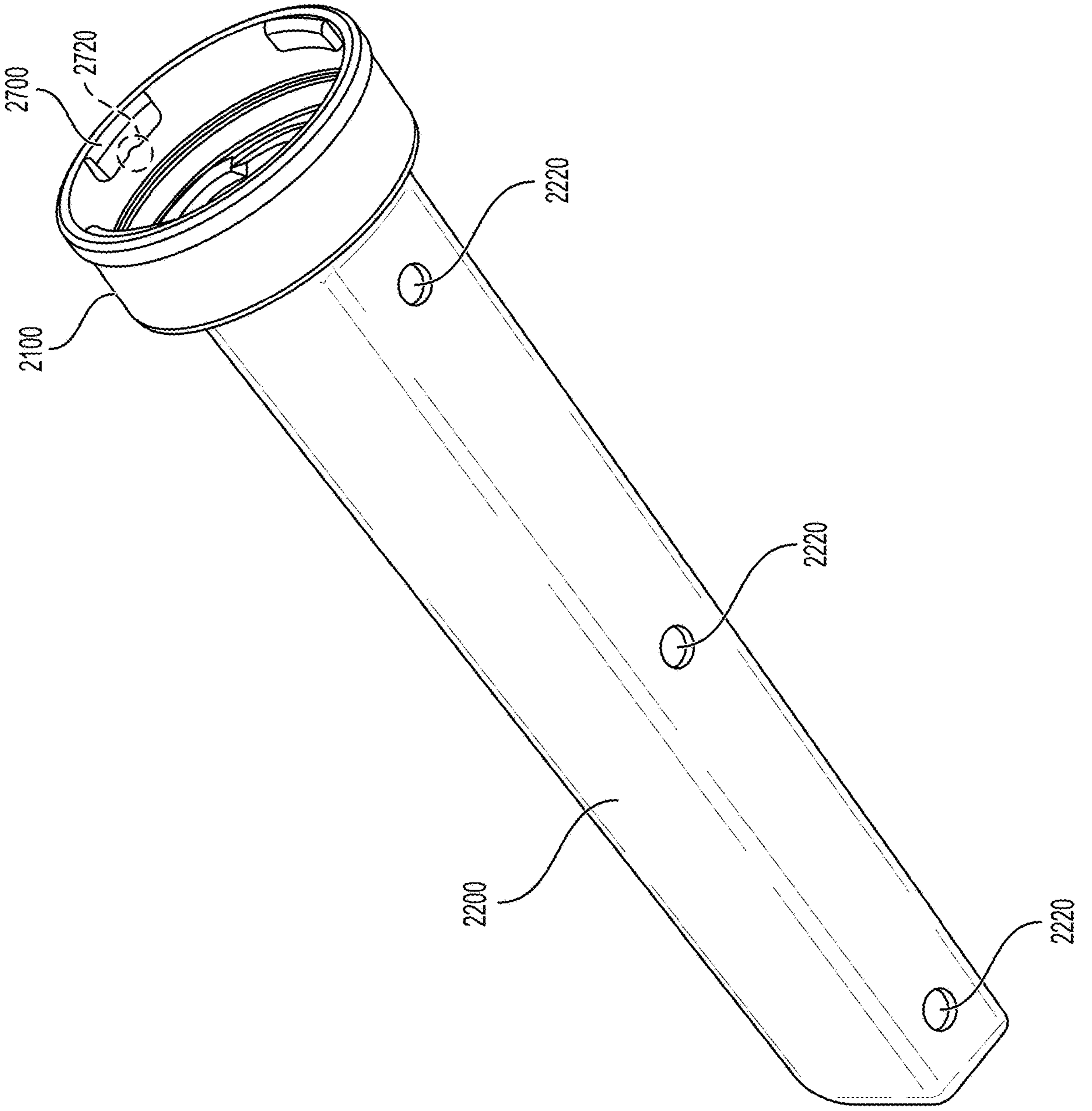
FIG. 18 is a bottom perspective view of an alternative distribution arm of the water dispenser.

FIGS. 14 to 16 also depict the lug stop 1710A and 1710B. The lug stop is to stop the distribution arm rotation. One of ordinary skill in the art can see that the lug stop can also be placed on the angled lug to prevent over compression of the O-ring. 1720A and 1720B are lug locks that are more prominently shown in FIG. 16. The lug lock is a sharp protrusion from the side of the lug. It interacts with lug notch (FIG. 18, 2720). The lug lock keeps the distribution arm from rotating on its own or due to vibrations.

Mounting attachments 1200A and 1200B are also shown in FIGS. 14 and 15. There is a mounting slot or hole 1210A, 1210B on the water reservoir for the bracket tab to enter. 4850 and 4800 are the distances from the bottom of the port to the top of the mounting bracket slot or hole and bottom of the mounting bracket slot or hole, respectively.

FIG. 16 shows a bottom view of the reservoir 1000 mounted in the mounting bracket 4000. 1300 is the reservoir lid surrounding the reservoir front side 1020 and the back side 1030. The bottom of the reservoir 1010 has a mounting lock 1020 protruding from the bottom. The mounting bracket base 4100 has a cut away so that the mounting lock can protrude into the cut away and prevent movement of the reservoir bottom from the mounting bracket.

Figure 17:
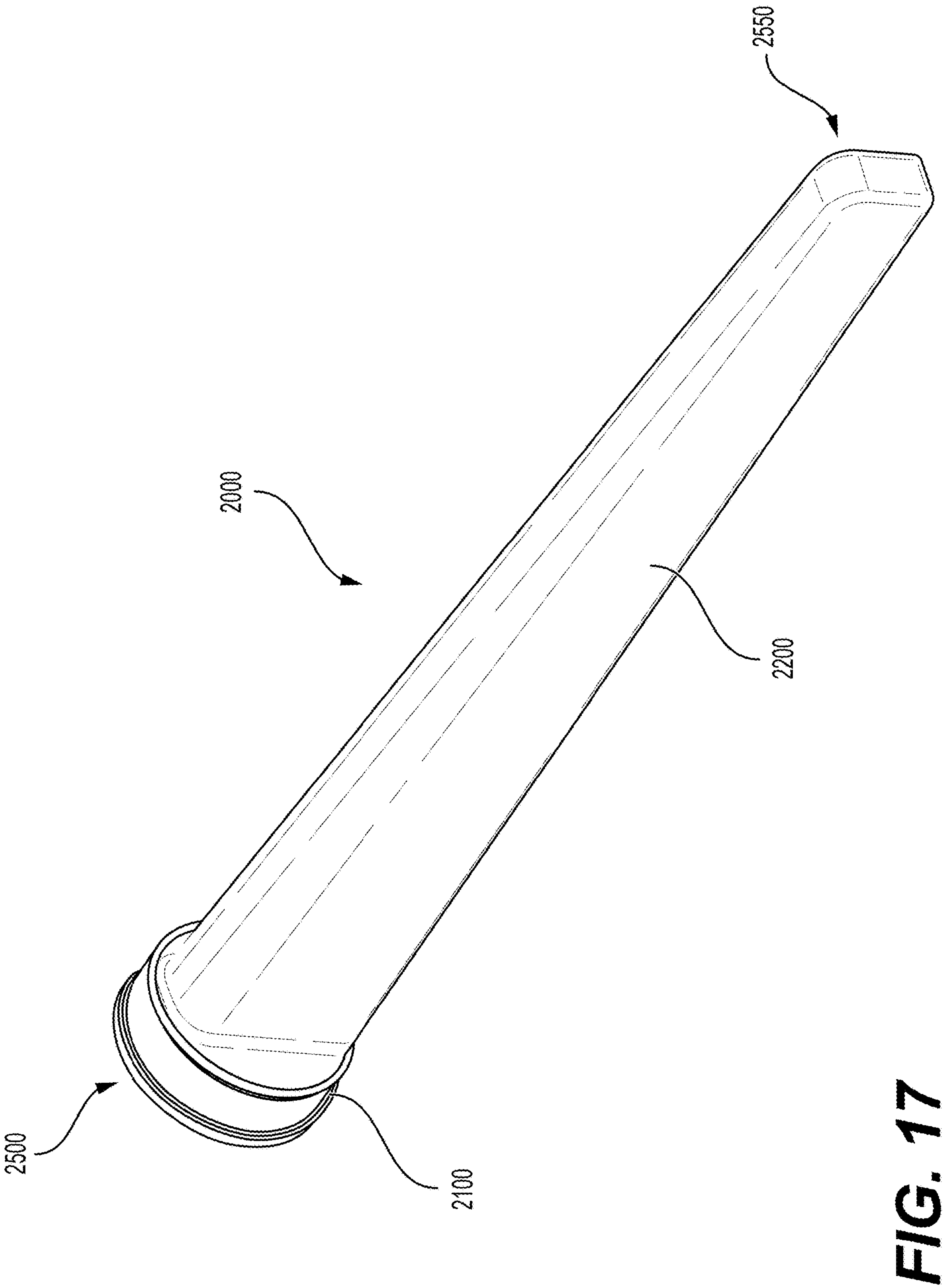
FIG. 17 is a top perspective view of an alternative distribution arm of the water dispenser.
Figure 19:
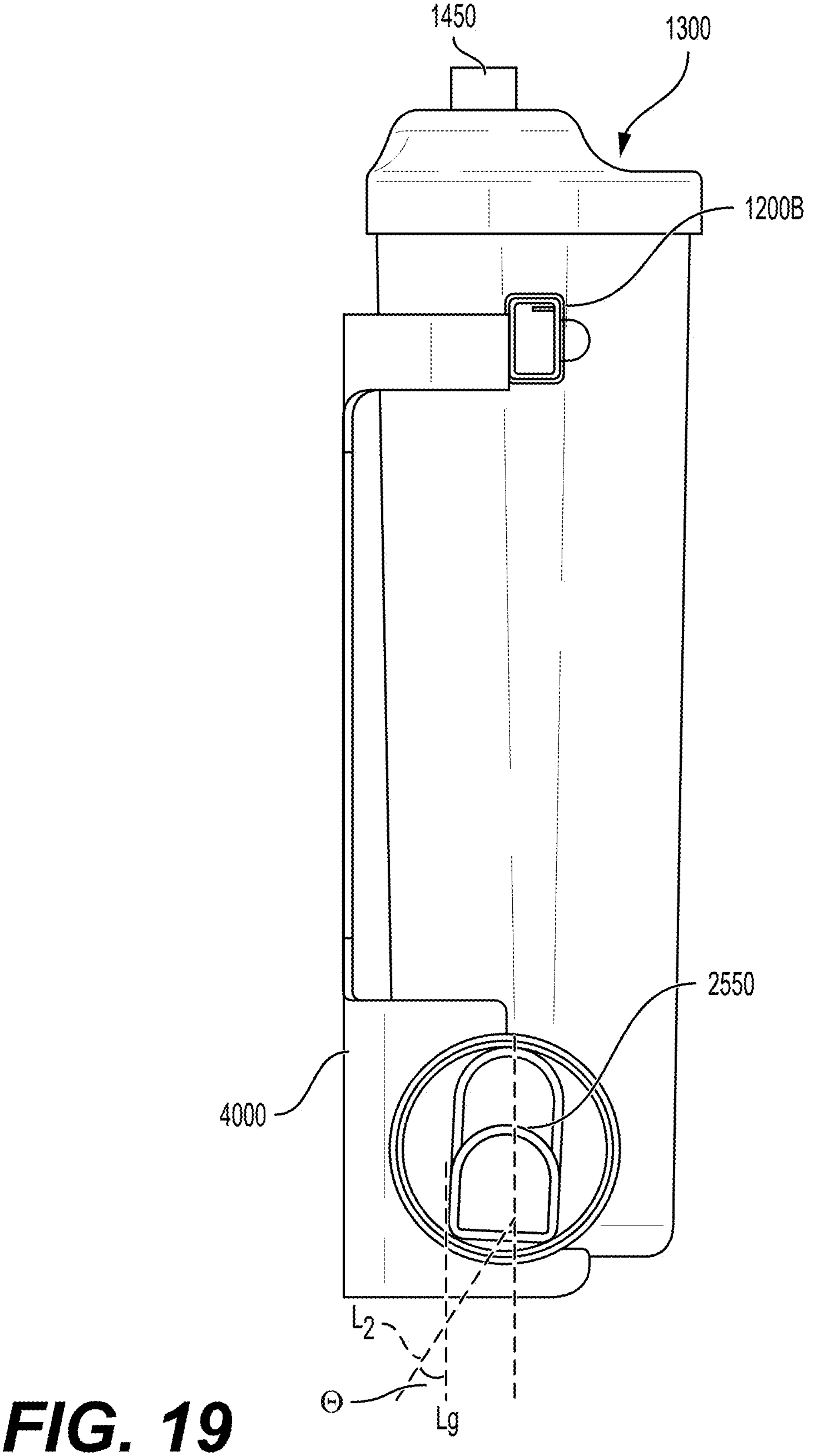
FIG. 19 is a side view of an alternative embodiment of the water dispenser.

FIGS. 17-19 show an alternative distribution arm 2000 with a distribution arm connector 2100 and a distribution arm carrier 2200. The distribution arm end is opposite the connector is 2550. As shown in FIG. 18, the distribution arm connector 2100 is configured to interact with the lugs on the reservoir port. Distribution arm lug 2700 has a lug notch 2720 to interact with the lug lock on the reservoir port. It should be evident that the lug lock could be on the distribution arm lug with the lug notch on the lug on the reservoir port. It should also be evident the straight and angled lug configurations can be used with O-ring around the port. It should also be evident that the lug stop, and/or the lug lock/lug notch can be used with either O-ring compression strategy or with any shape of the distribution arm.

FIG. 18 also shows valve receivers 2220 for the insertion of the drinking valves. The valve receiver can also be threaded to receive a threaded drinking valve. A mentioned earlier, the connection of the distribution arm can be configured so that the drinking valves do not point straight down to the ground. The drinking valves are preferably angled so that tip of the valve extends beyond the imaginary line formed by the ground to the edge distribution arm (Lg, FIG. 19) along the line of sight (L2) from the ground. This is accomplished by placing the drinking valve at an angle to the same imaginary line. Because the line from the ground is perpendicular to the ground, the angle mentioned earlier is the same angle. This angle (Θ, FIG. 19) is preferably in the range of 5 to 45 degrees. In this manner, the drinking zone directly above the drinking fowl is not covered by the distribution arm. The fowl prefer this, as it allows them to watch the sky for predators.

Figure 20:
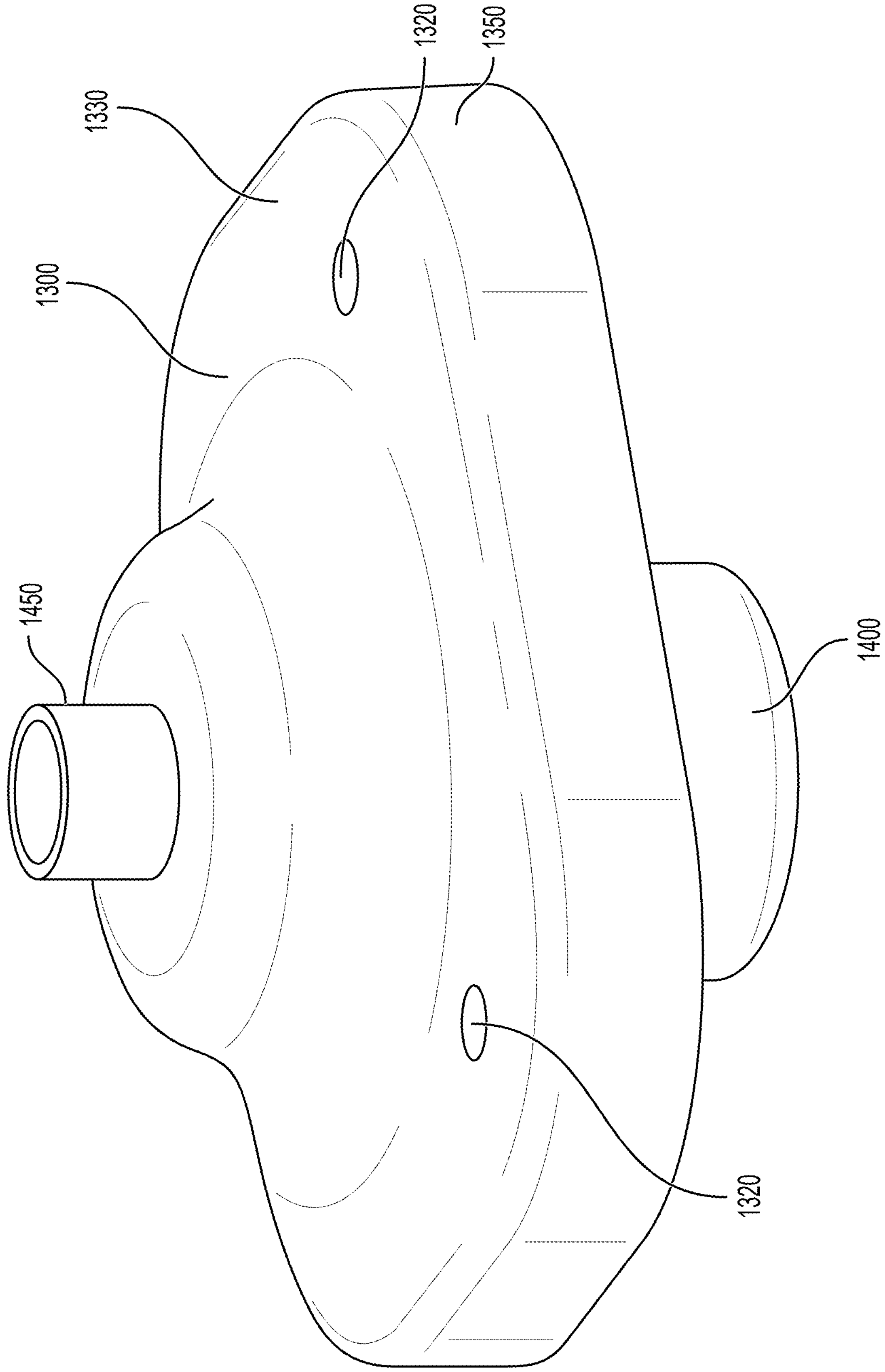
FIG. 20 is a top perspective view of the lid and valve of an alternative embodiment of the water dispenser.
Figure 21:
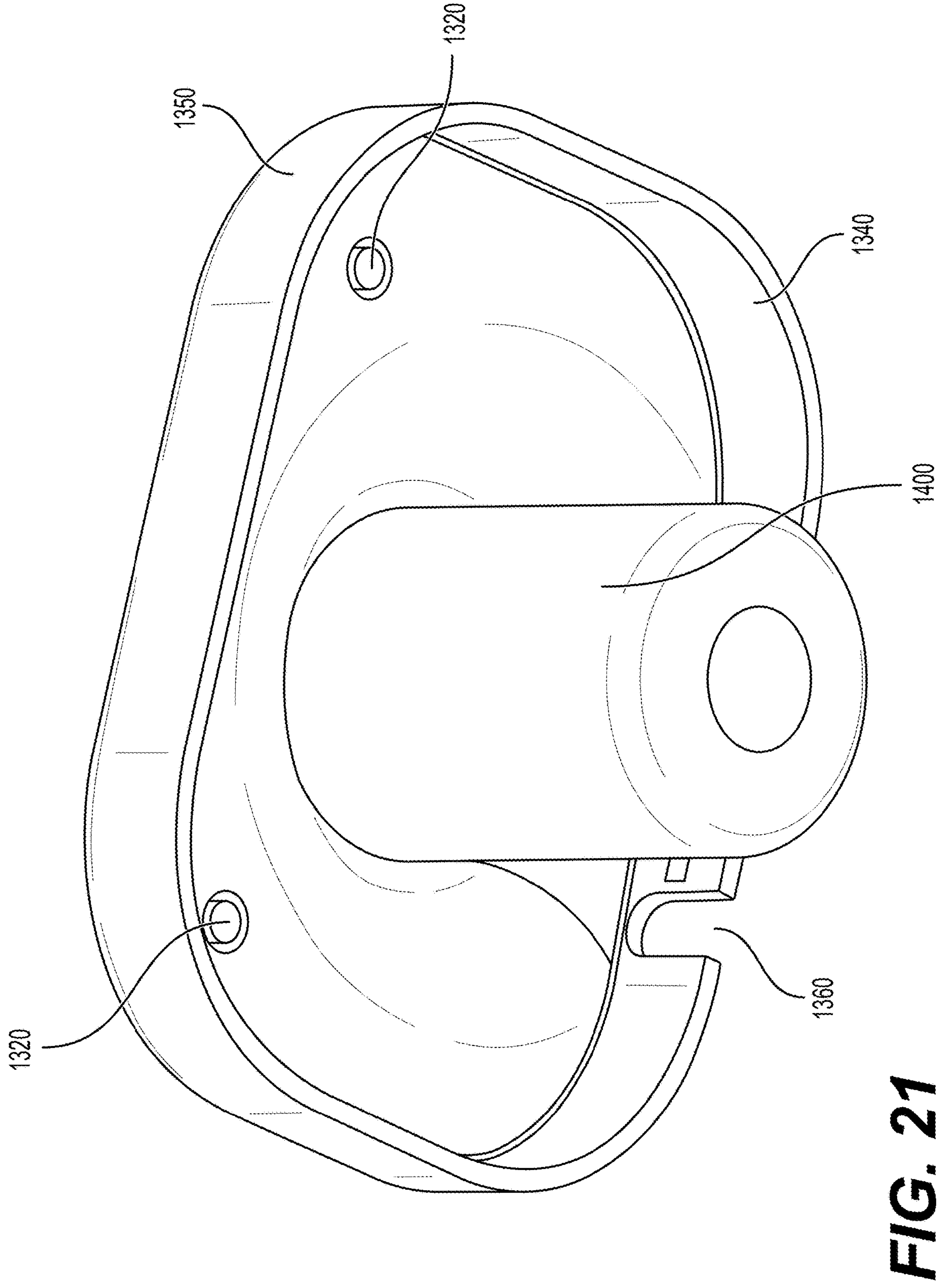
FIG. 21 is a bottom perspective view of the lid and valve of an alternative embodiment of the water dispenser.
Figure 22:
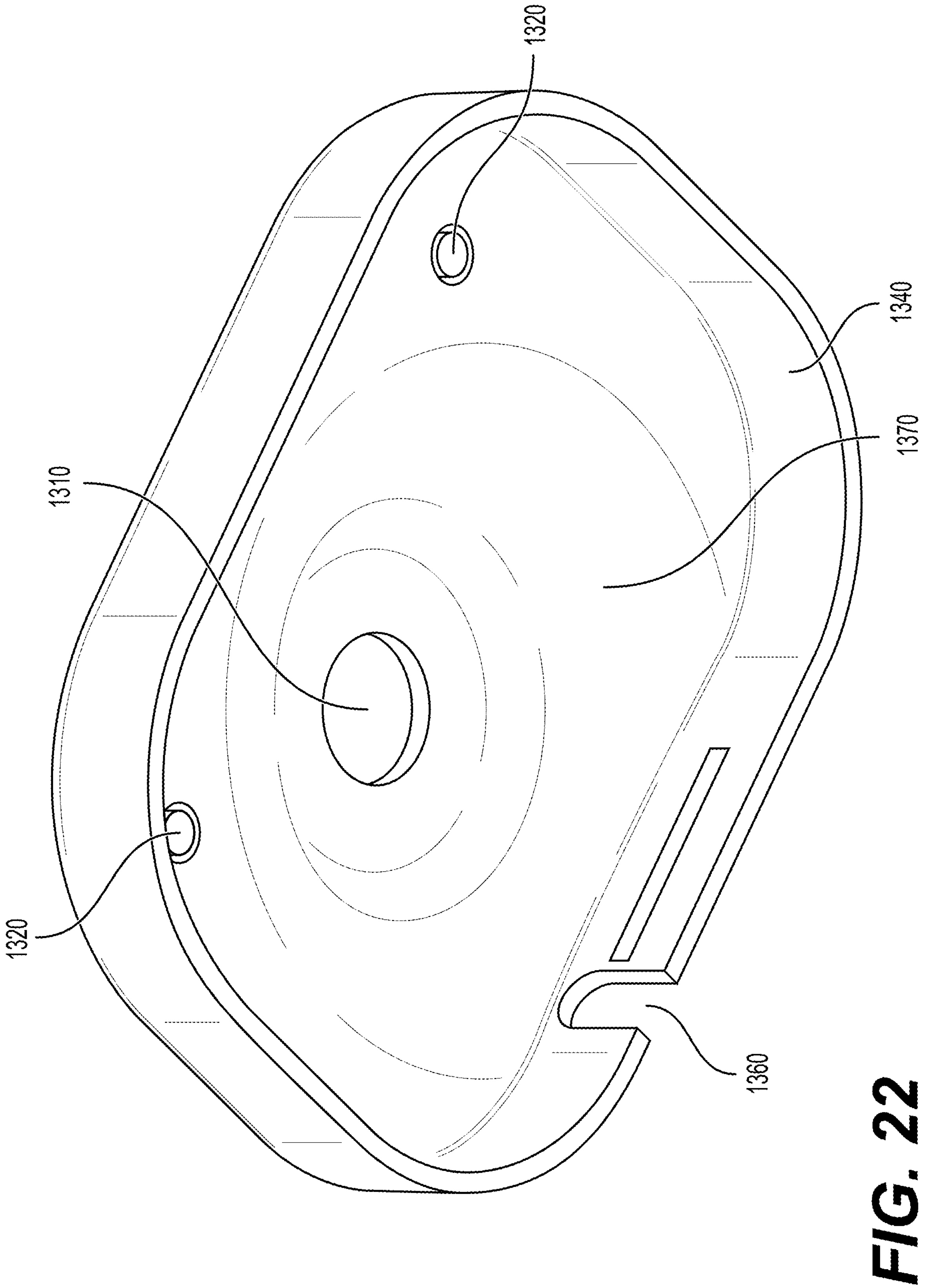
FIG. 22 is a top perspective view of the lid of an alternative embodiment of the water dispenser.
Figure 23:
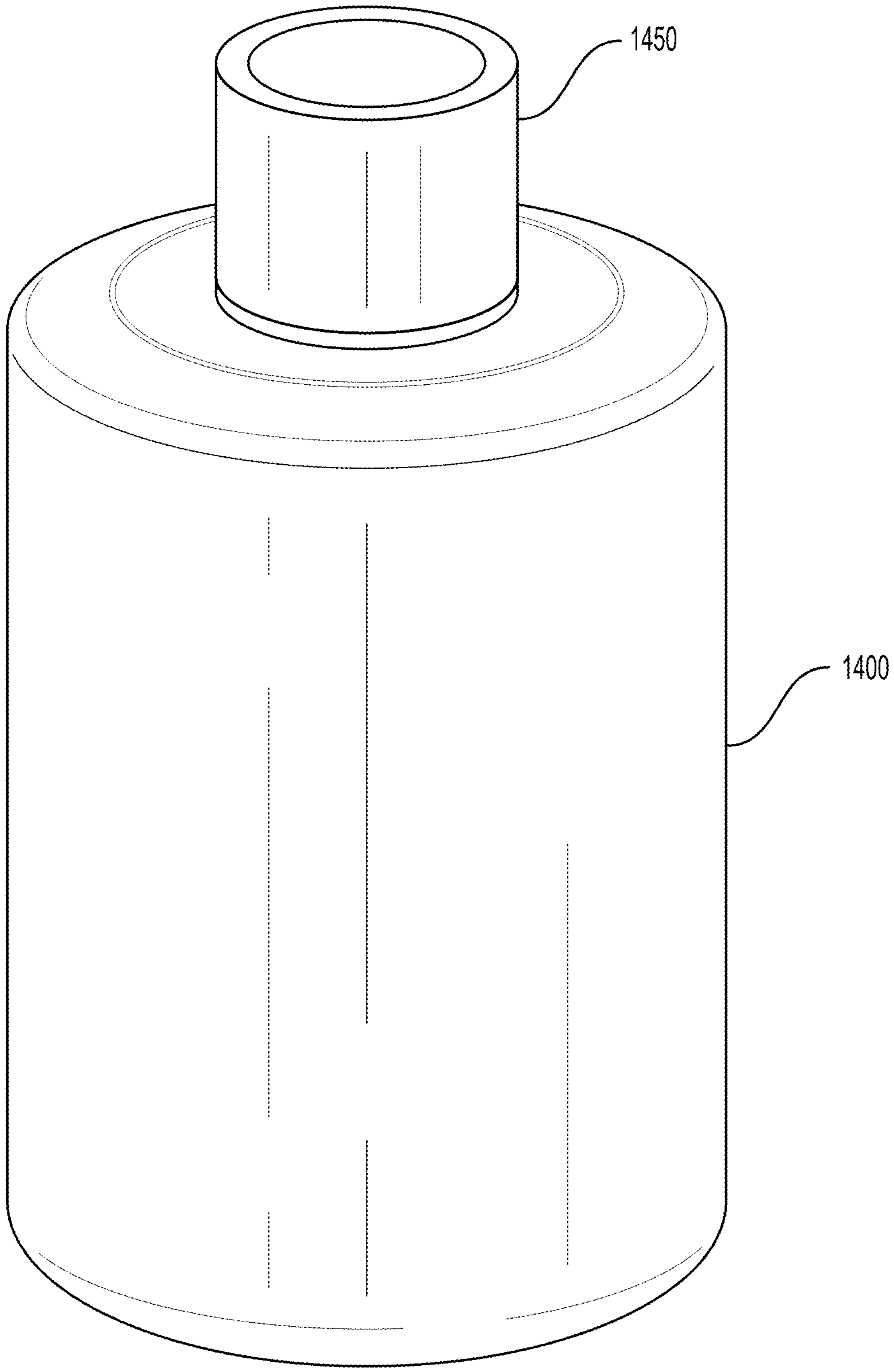
FIG. 23 is a top perspective view of an alternative valve of an alternative embodiment of the water dispenser.

FIGS. 20 to 22 shows the lid with the water level control device attached. The inlet port 1450 of the water level control device 1400 (FIG. 23) is shown passing through lid 1300. The lid had two vent holes 1320, a top side 1330, an underside 1370, an outside wall 1350 and an inside wall 1340. It also has an inlet notch 1360 for electrical lines, probes or other monitoring devices. As shown in FIG. 22, there is an underside opposite the top side. The water level control device can be fixed via an adhesive or the inlet port could be threaded and a nut used to tighten the device to the lid.

Figure 24:
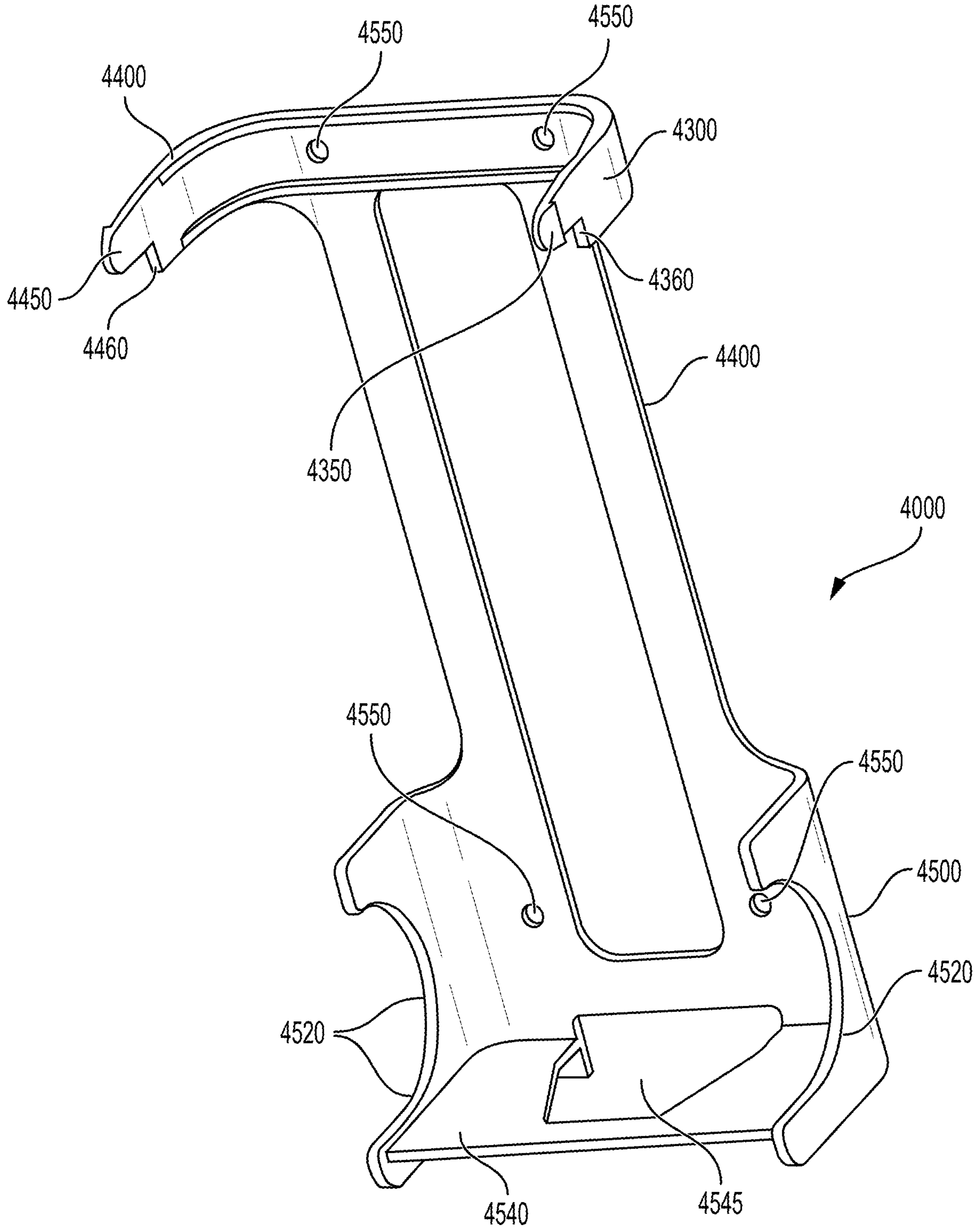
FIG. 24 is a top perspective view of a mounting bracket.
Figure 25:
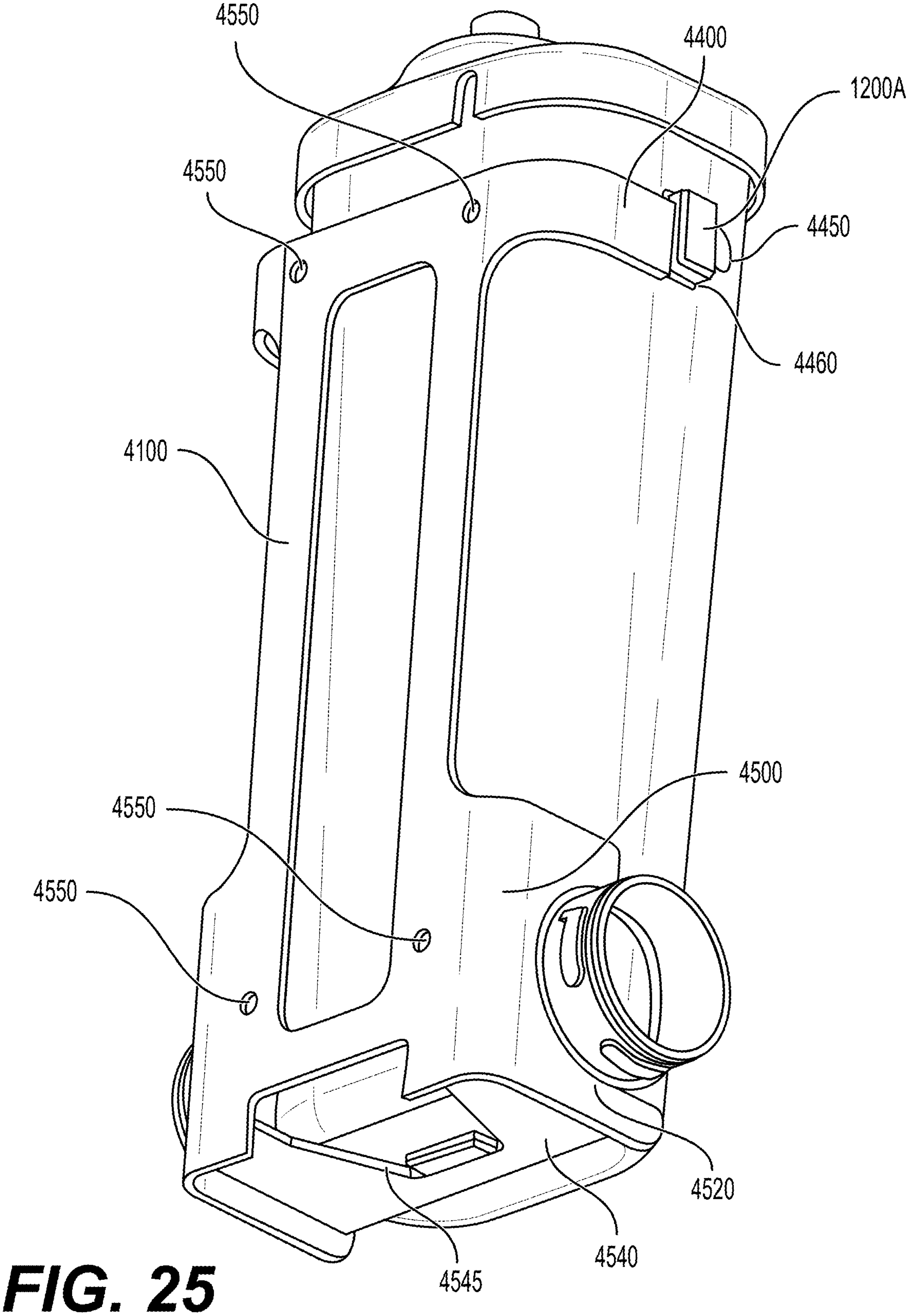
FIG. 25 is a bottom perspective view of an alternative embodiment of the water dispenser in a mounting bracket.
Figure 26:
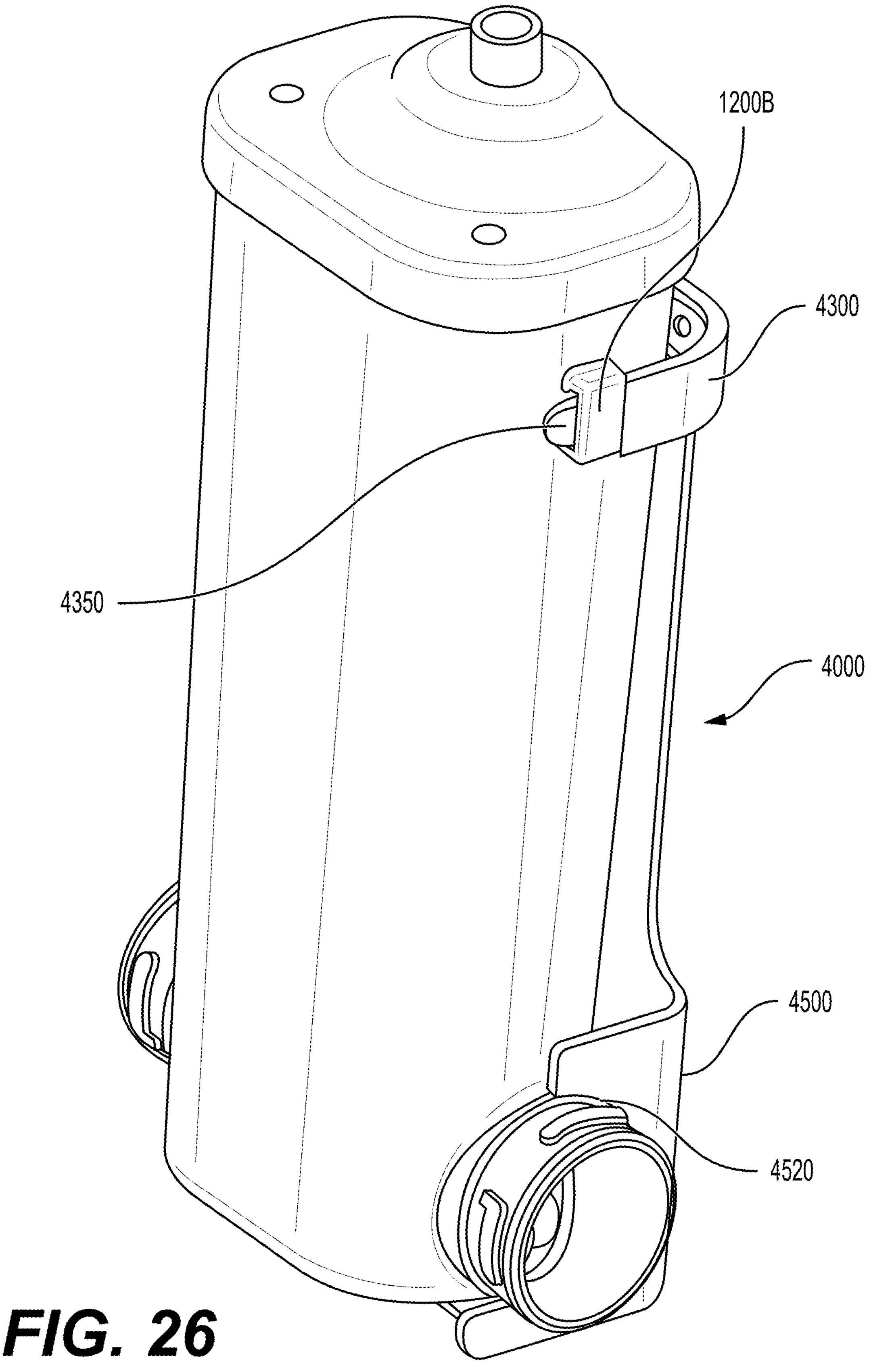
FIG. 26 is a top perspective view of an alternative embodiment of the water dispenser in a mounting bracket.

FIGS. 24 to 26 show the mounting bracket 4000. The mounting bracket has a base 4500 which is attached to the cradle 4520. The base has a support 4540 with a cutaway hole 4545. The mounting bracket further has a back 4100 attaching the base to the mounting bracket top. The top of the mounting bracket has two locking arms 4400, 4300 that slide on either side of the reservoir. There are two locking tabs 4450, 4350 that slide into the mounting bracket 1200A, 1200B slots or holes 1210A, 1210B. There are through holes 4550 for fixing the mounting bracket to a wall or post.

Figure 27:
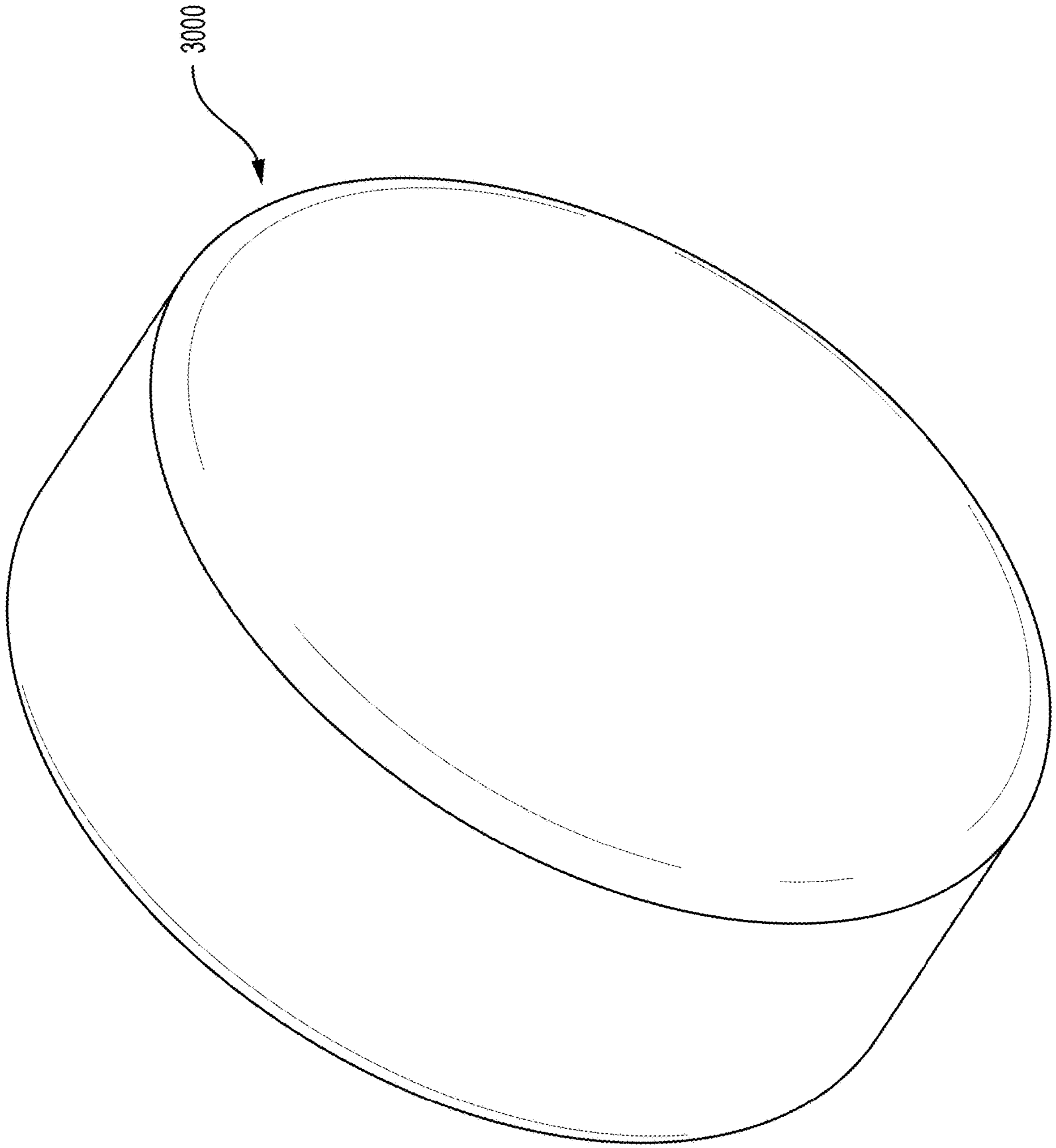
FIG. 27 is a side perspective view of a cap.
Figure 28:
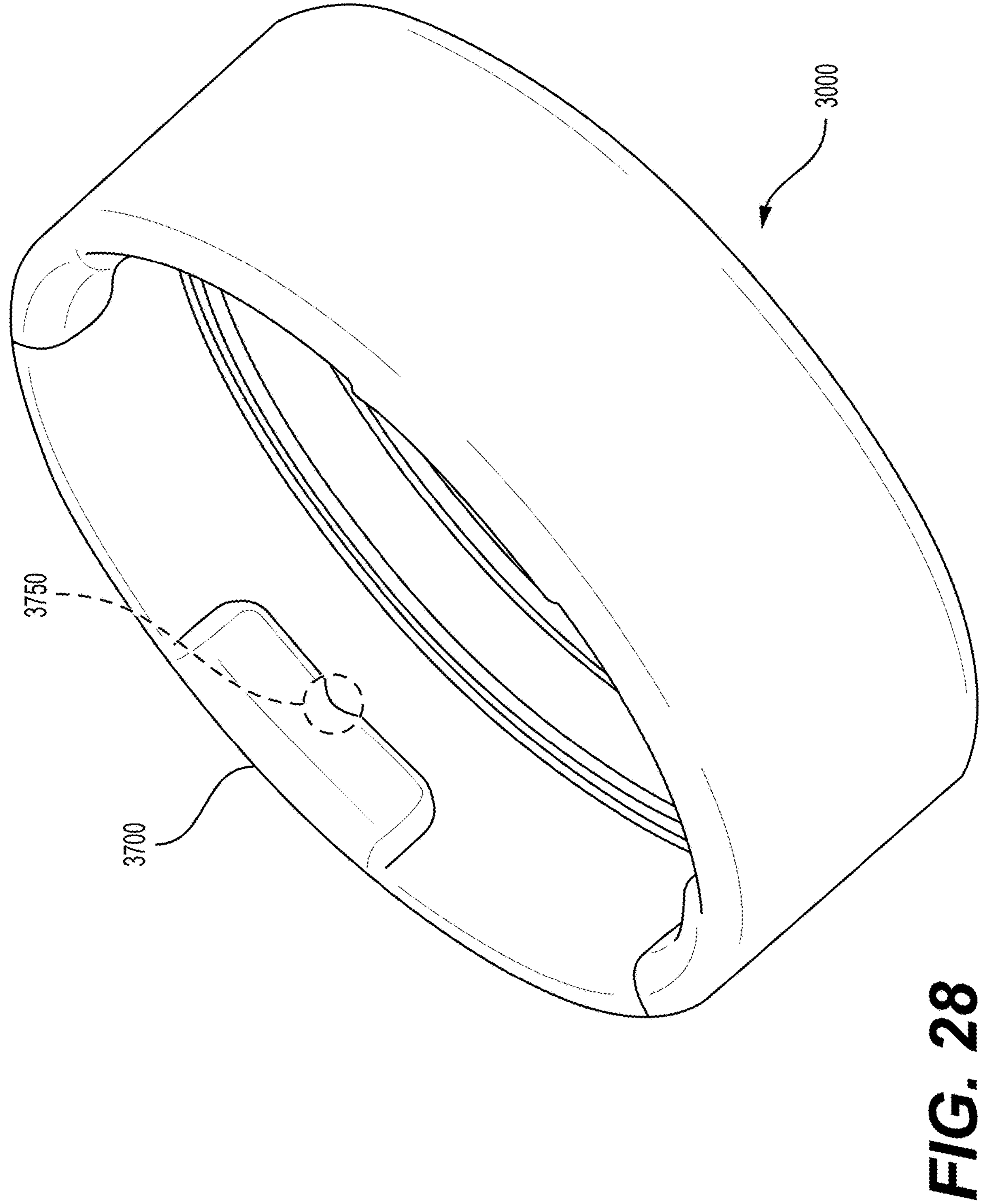
FIG. 28 is an inside view of a cap.

FIGS. 27 and 28 show an end cap 3000 used to close off one of the distribution ports. Like the distribution arm connector, it has lugs 3700, which could be angled or straight, to seal the port leaking water. There is also the optional lug notch 3750 or lug lock show in FIG. 28.

Based upon the figures and explanation above it is clear that the improved water dispenser will have a water reservoir comprising a top end, a bottom end, and at least one sidewall, a connector port. This water reservoir will have at least one connector port and at least one distribution arm. The connector port may have straight or angled lugs. At least one of the straight or angled lugs may have a lug stop. The distribution arm may have a lug which may also be straight or angled. The distribution arm lug may or may not have a lug lock.

The distribution arm and the connector can be configured to mate or align so that the drinking valves are preferably angled so that tip of the valve extends beyond the imaginary line formed by the ground to the edge distribution arm (Lg, FIG. 19) along the line of sight (L2) from the ground. This is accomplished by placing the drinking valve at an angle to the same imaginary line. Because the line from the ground is perpendicular to the ground, the angle mentioned earlier is the same angle. This angle (Θ, FIG. 19) is preferably in the range of 5 to 45 degrees.

Figure 7:
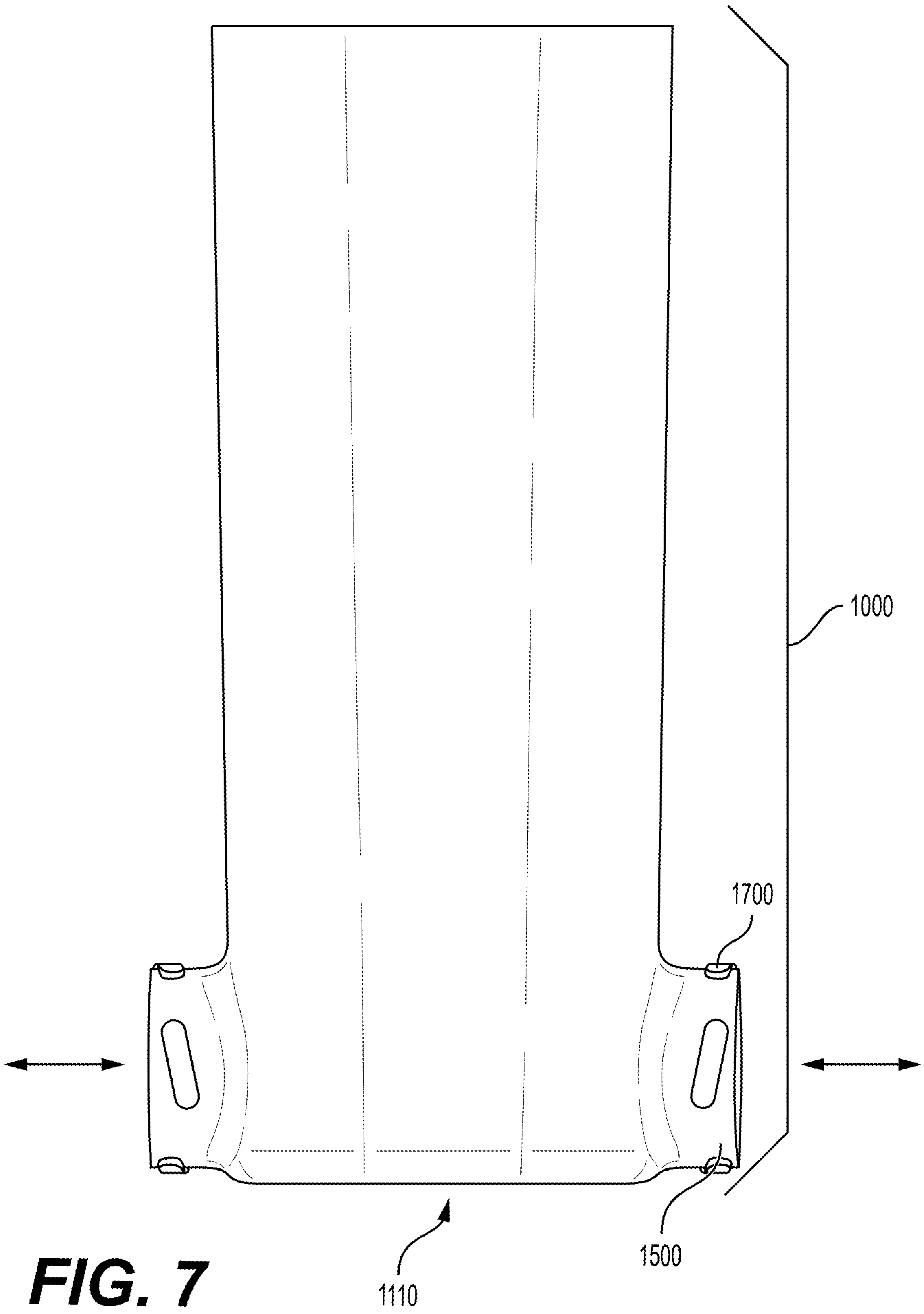
FIG. 7 is a front facing view of an embodiment of the invented water dispenser.
Figure 8:
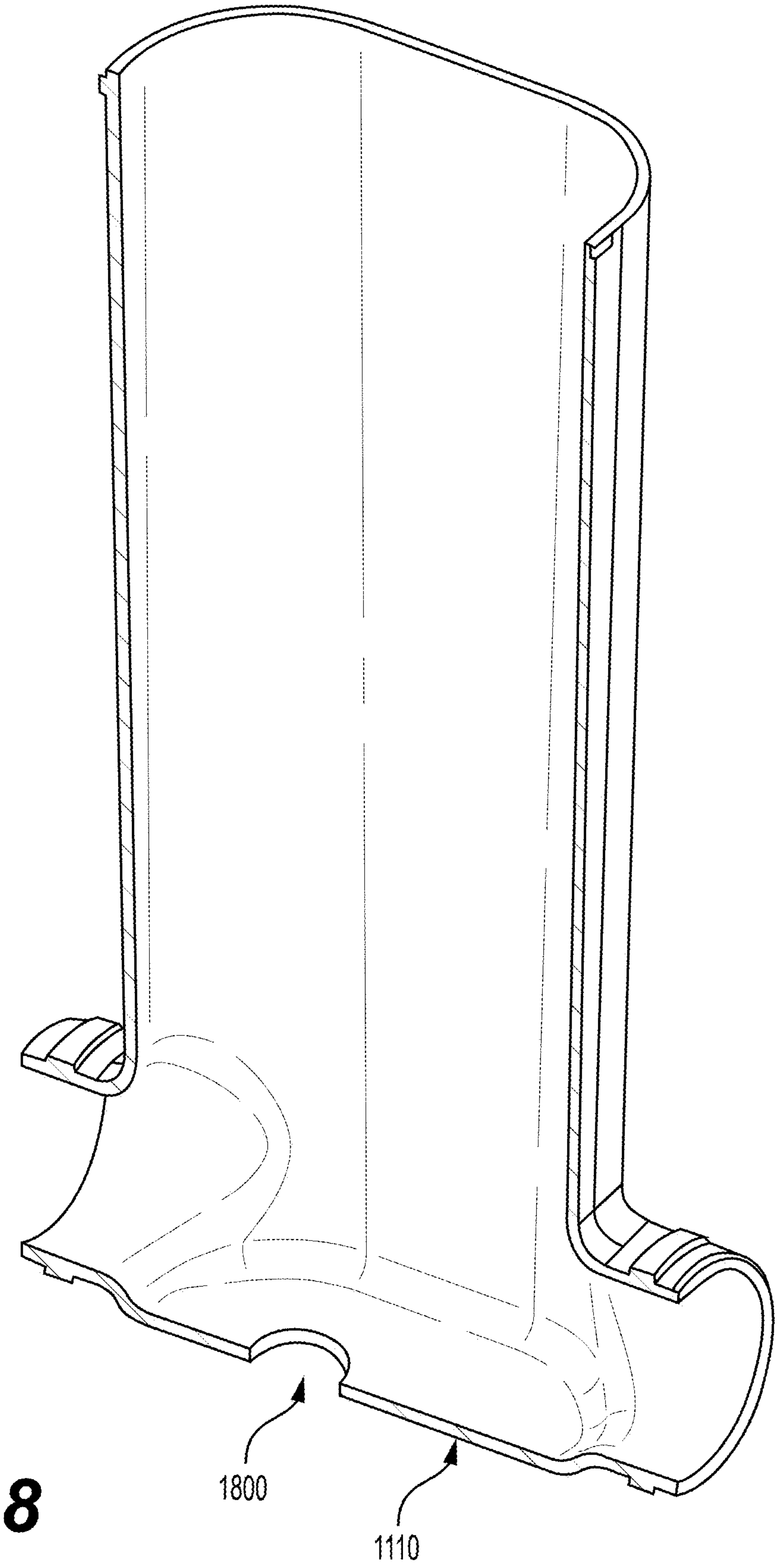
FIG. 8 is a cutaway of the perspective view of an embodiment of the invented water dispenser.
Figure 9:
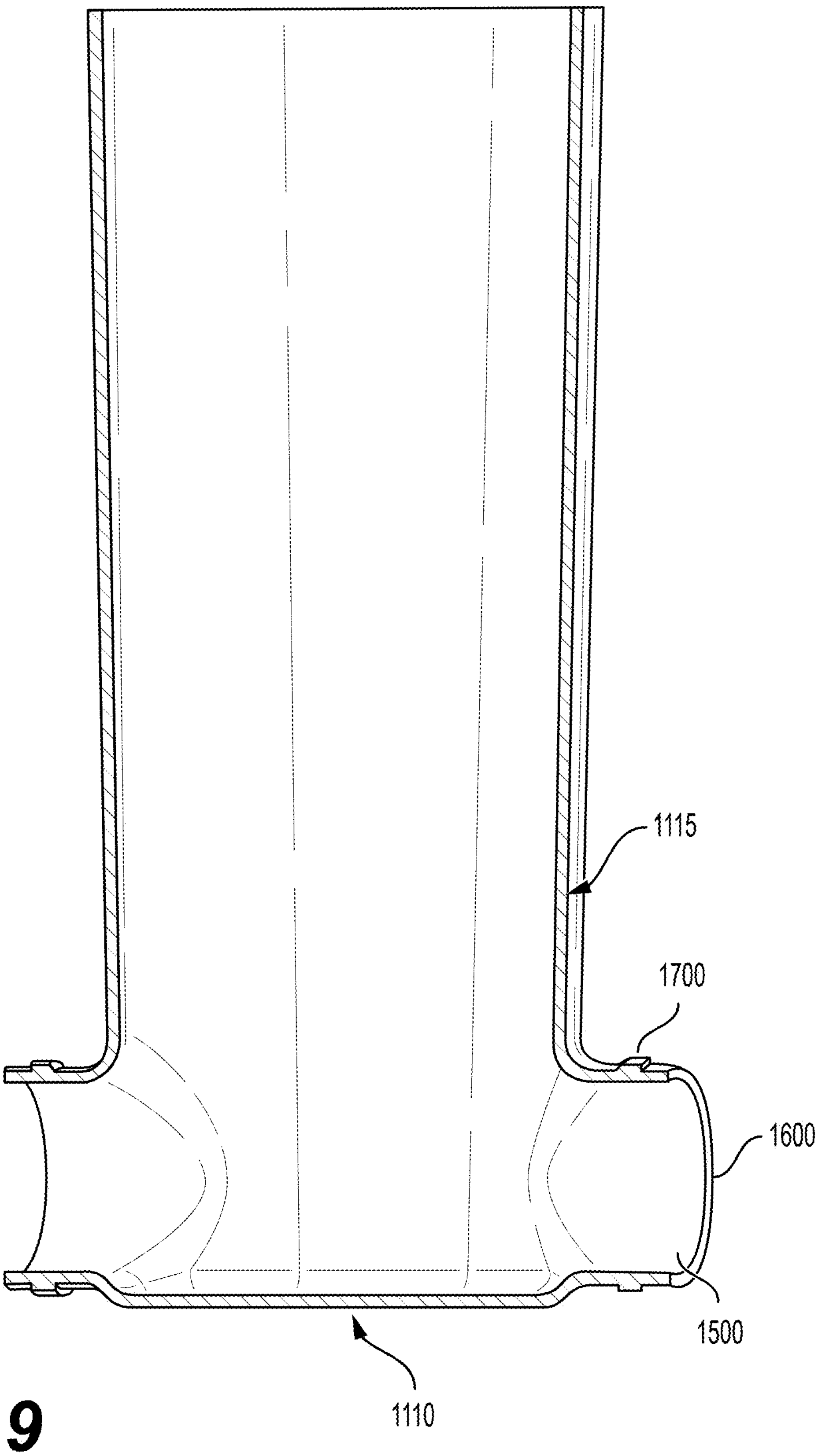
FIG. 9 is a cutaway of the frontal view of an embodiment of the invented water dispenser.
Figure 10:
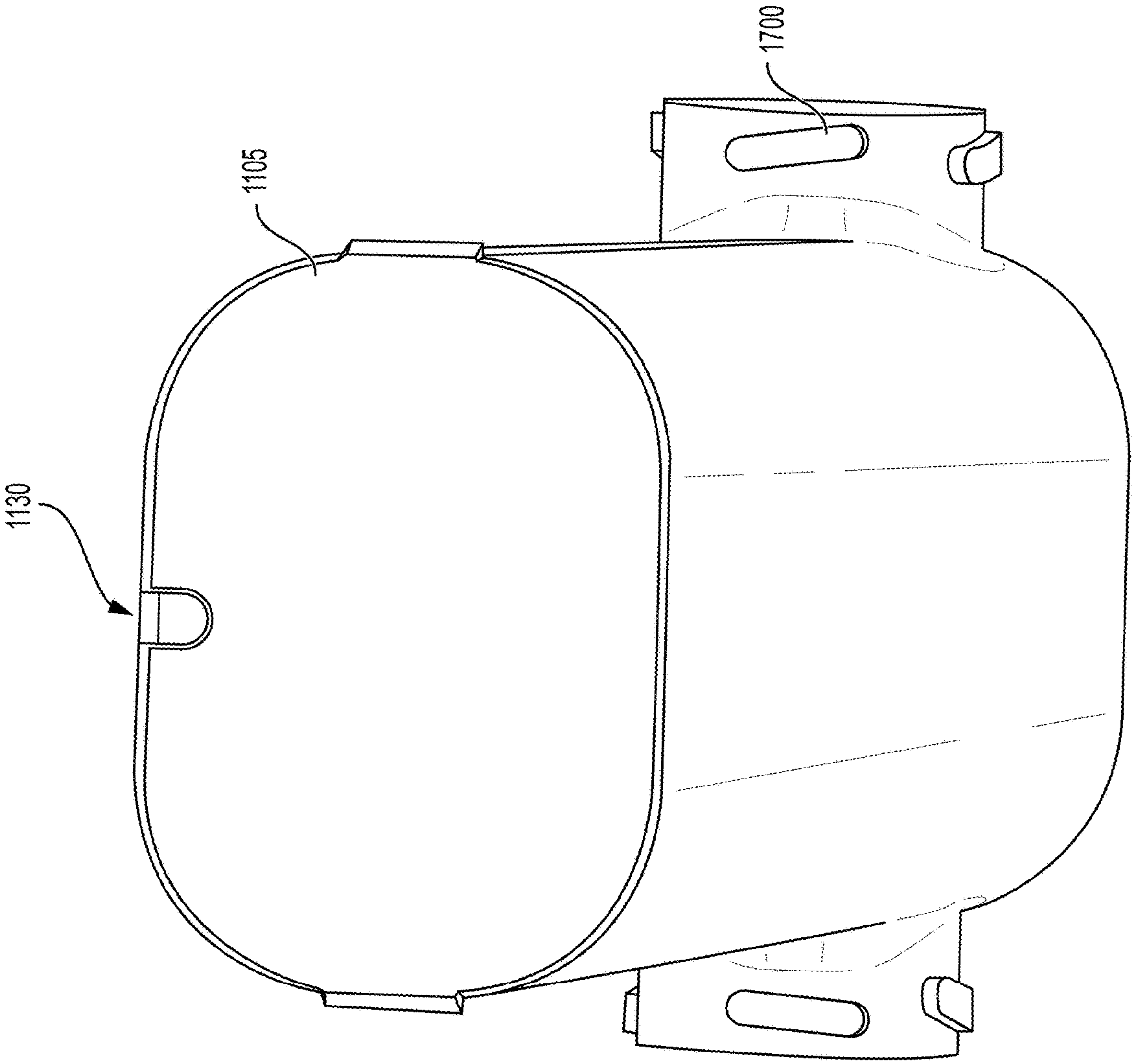
FIG. 10 is a perspective top view of an embodiment of the invented water dispenser.
Figure 11:
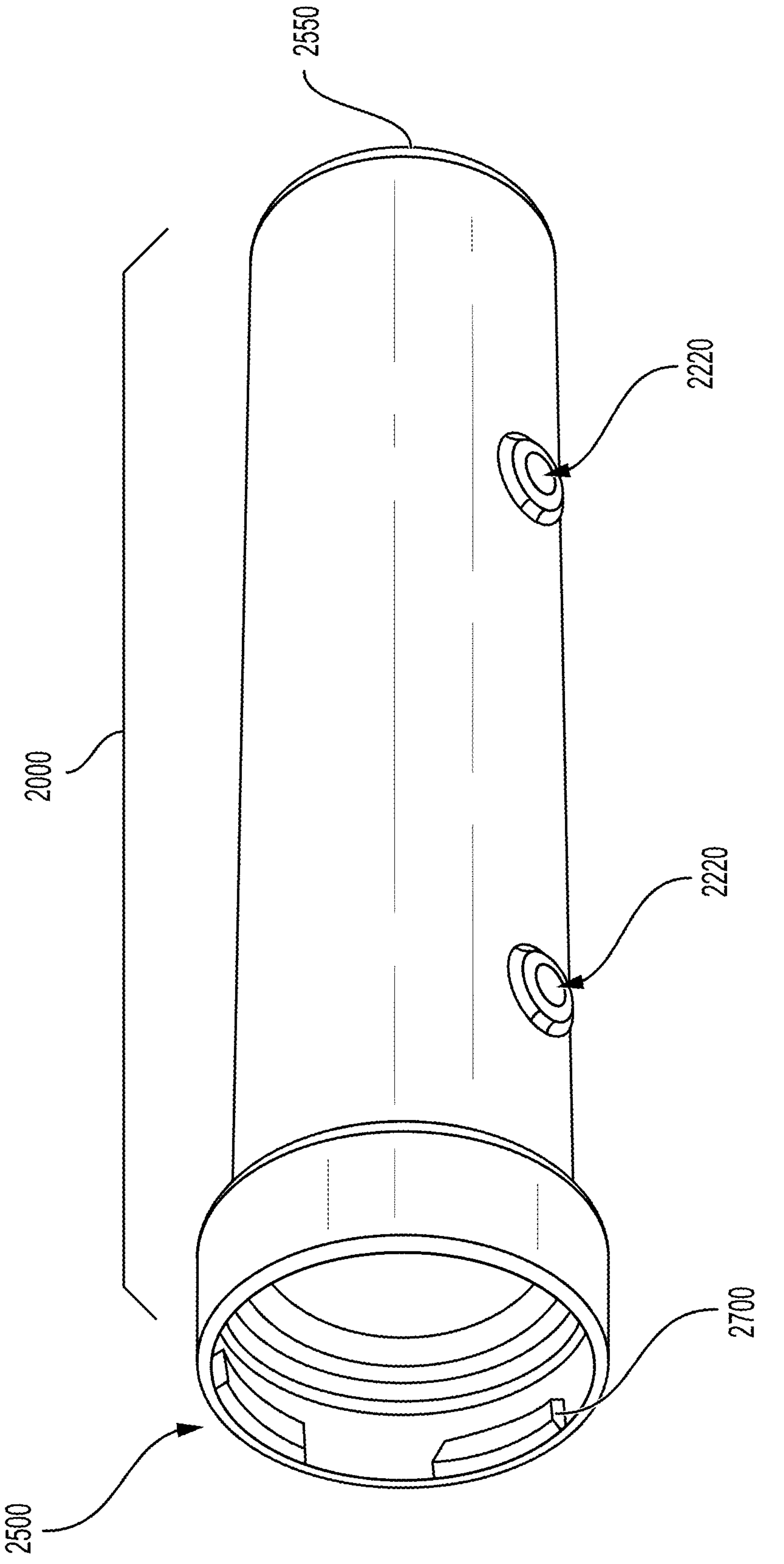
FIG. 11 is a perspective view of a distribution arm.
Figure 12:
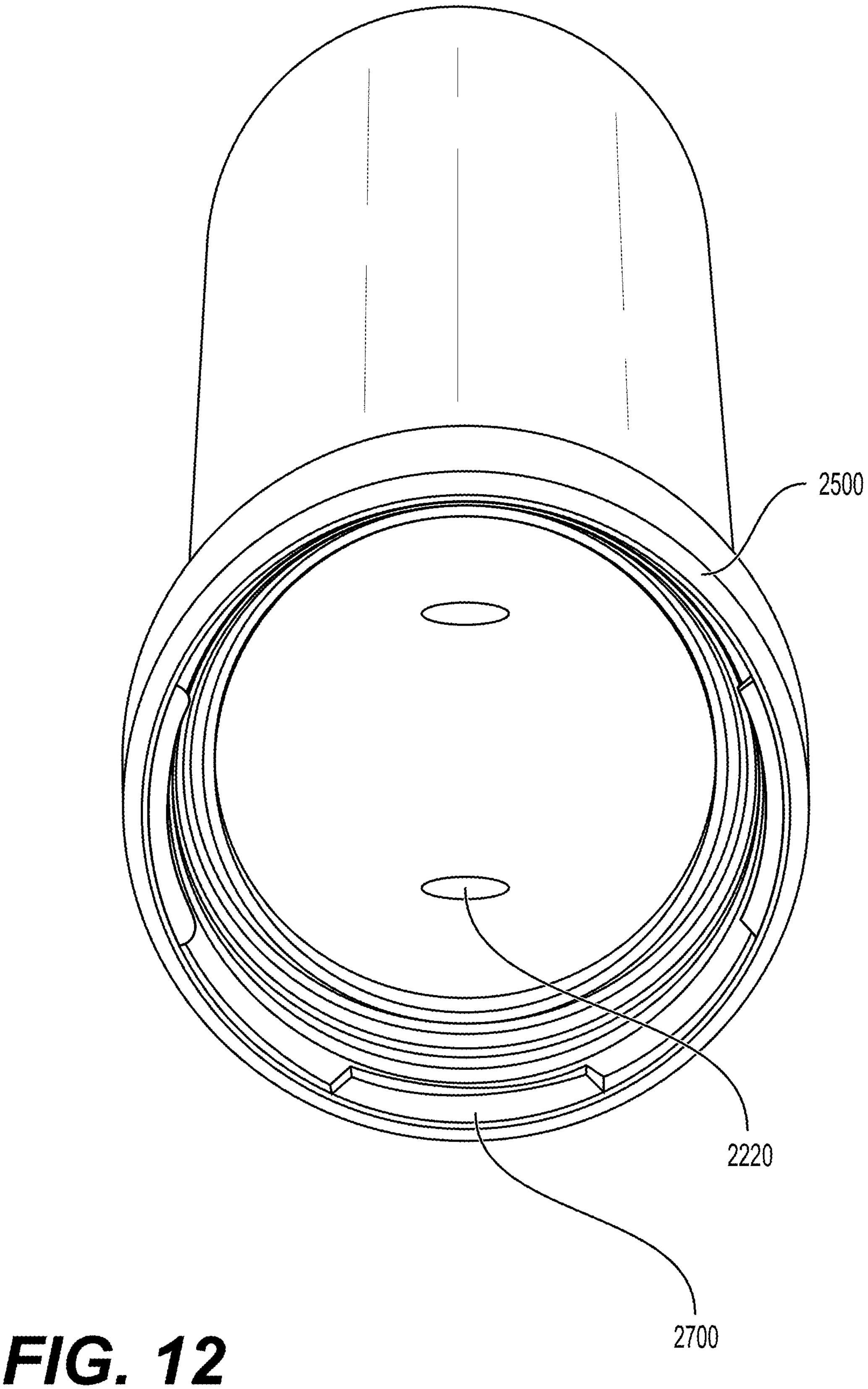
FIG. 12 is a perspective view of the inside of a distribution arm.

The improved water dispenser will also have a gasket, such as an O-ring which is compressed in the tightening direction as shown in the bi-directional arrows in FIG. 7 or in the radial direction as shown by the two facing arrows in FIG. 15. The improved water dispenser of any of the above configurations will have a water level control mechanism which may a valve at the bottom of the water reservoir, or a valve located at the top of water reservoir, or in the lid. The water reservoir of any configuration may or may not have mounting attachments. If there are mounting attachments, the kit may optionally include a mounting bracket.

Figure 29:
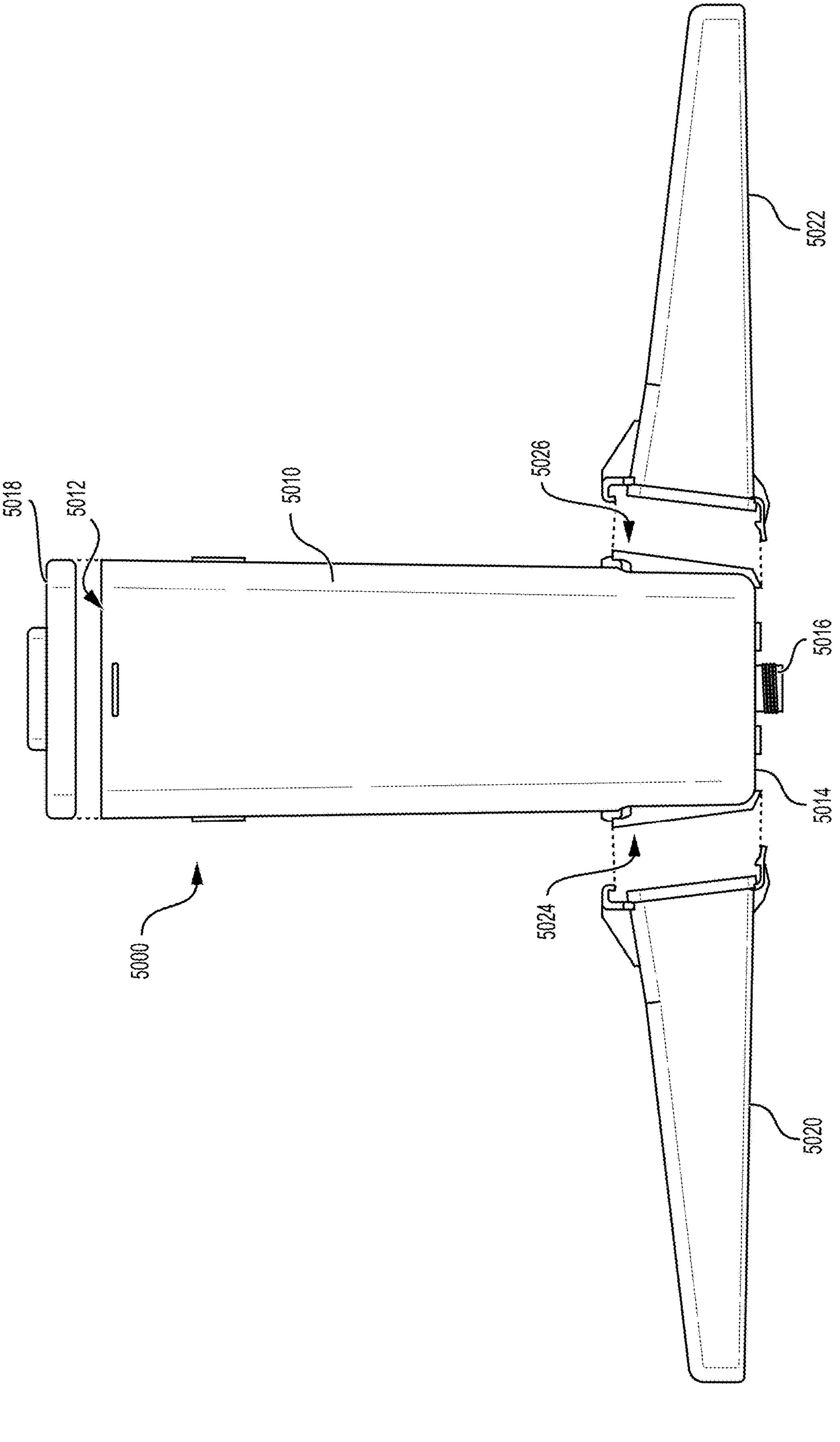
FIG. 29 is an exploded view of an alternative embodiment of the device for dispensing water.
Figure 30:
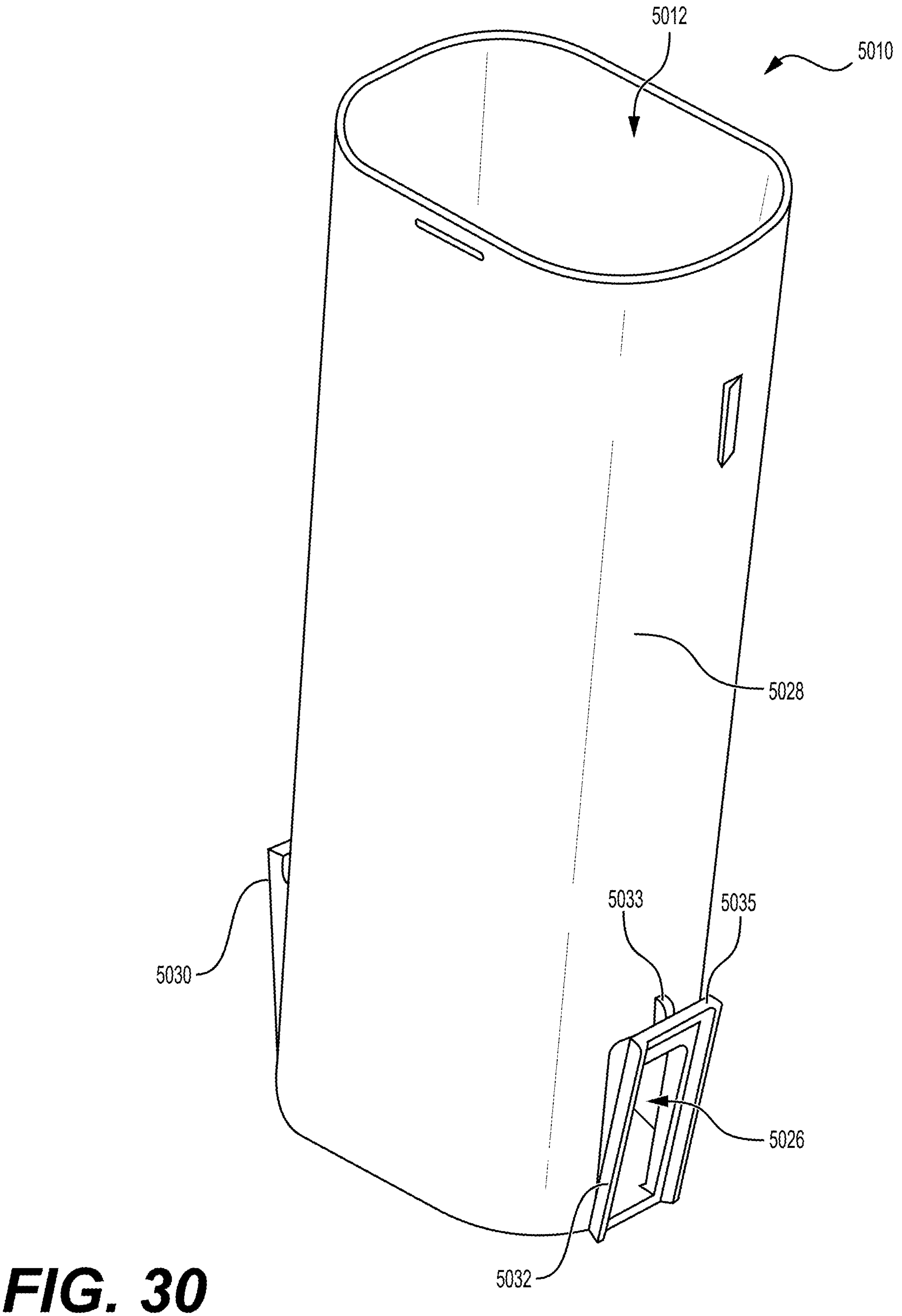
FIG. 30 is a perspective view of a water reservoir of the device for dispensing water of FIG. 29.

In the alternative embodiment of FIGS. 29-36, the device for dispensing water 5000 is similar to the previous embodiments, including a water reservoir 5010 having opposed top and bottom ends 5012, 5014, respectively, and at least one water reservoir sidewall 5028. It should be understood that the overall shape and relative dimensions of water reservoir 5010 are shown for exemplary purposes only and may be varied. Water reservoir 5010 is hollow and is adapted for receiving water for distribution to the fowl. As in the previous embodiments, a port 5016 may be provided in the bottom end 5014 for connection to a water level control mechanism. It should be understood that any suitable type of water level control mechanism, such as the float fill valve 400B or the valve shown in FIGS. 20-22, as non-limiting examples, may be used. Further, the top end 5012 may be open and may be releasably covered by a lid 5018. It should be understood that the overall shape and relative dimensions of lid 5018 are shown in FIGS. 29, 33A and 33B for exemplary purposes only and that any suitable type of lid may be used. Additionally, as shown in FIG. 33B, the lid 5018 may include a notch 5019, similar to notch 1360 shown in FIGS. 21 and 22, for receiving the cord or cords associated with, as a non-limiting example, an electric water heater.

At least one connector port is formed in the at least one water reservoir sidewall 5028. In the non-limiting example of FIGS. 29 and 30, two connector ports 5024, 5026 are formed in the water reservoir 5010, adjacent the bottom end 5014. It should be understood that the location of the connector ports 5024, 5026 relative to the at least one sidewall 5028, as well as the number, shape and relative dimensions of the connector ports 5024, 5026, are shown for exemplary purposes only.

Figure 31:
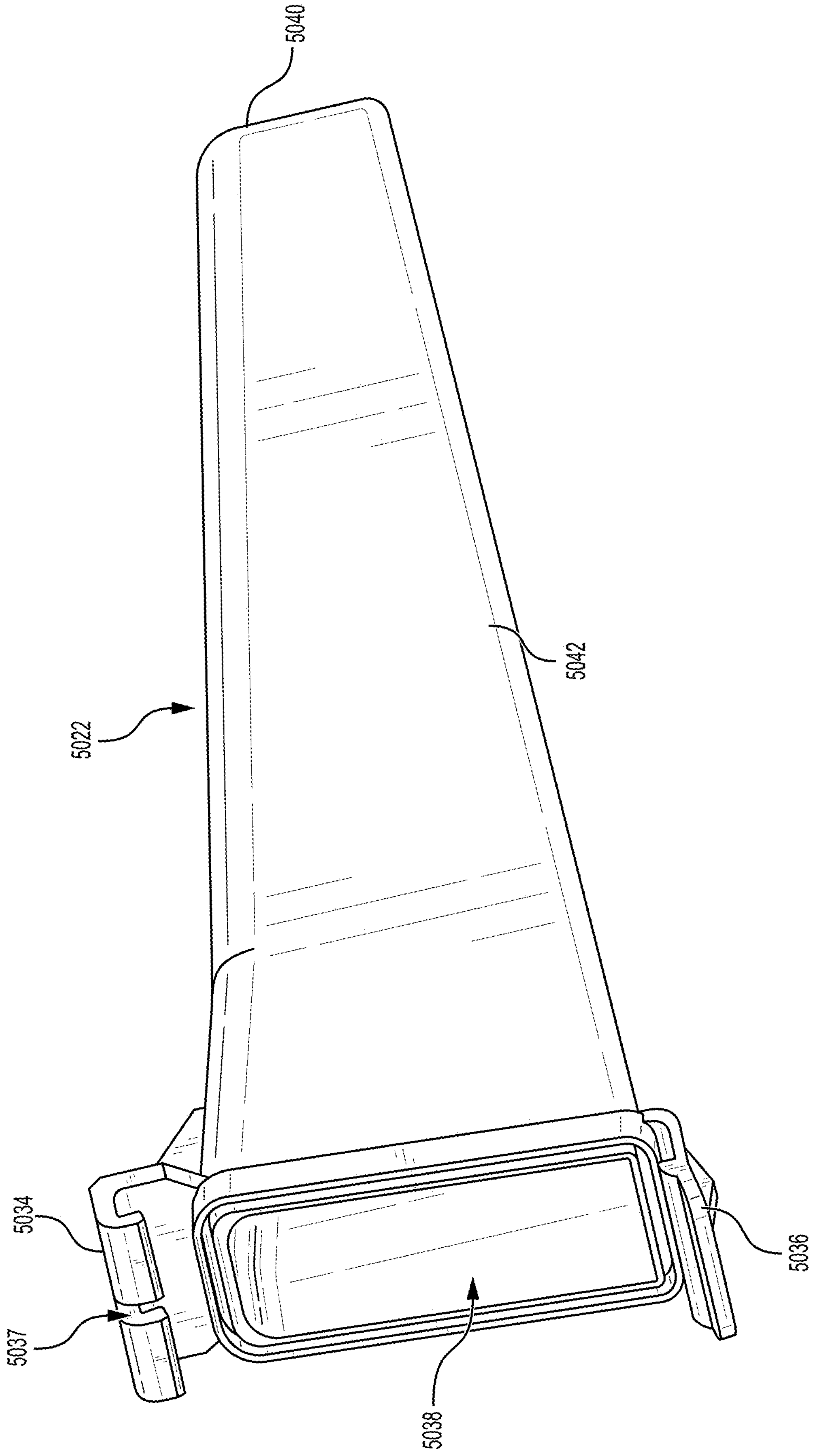
FIG. 31 is a perspective view of a water distribution arm of the device for dispensing water of FIG. 29.
Figure 32:
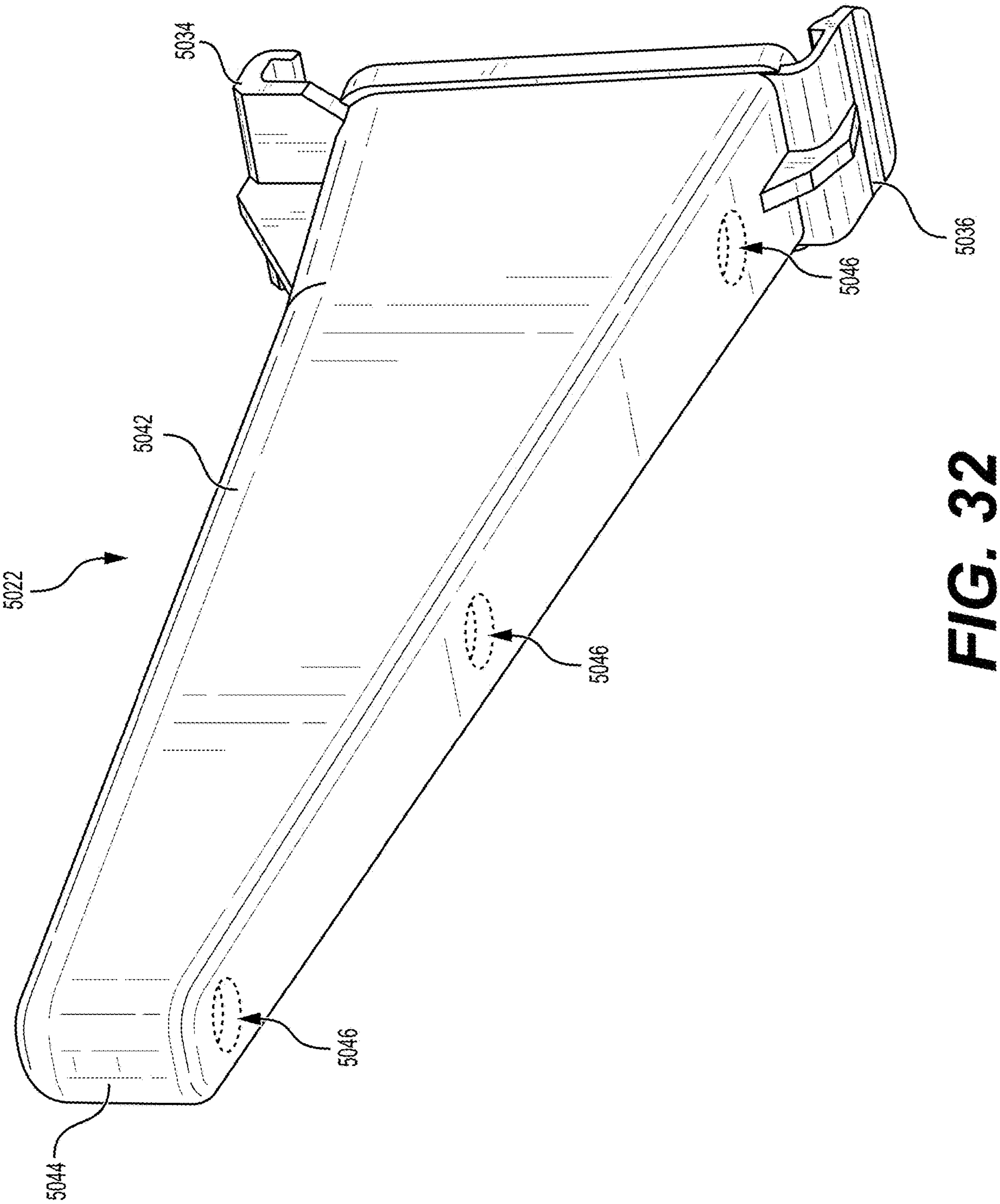
FIG. 32 is a perspective view of a water distribution arm of the device for dispensing water of FIG. 29.
Figure 33A:
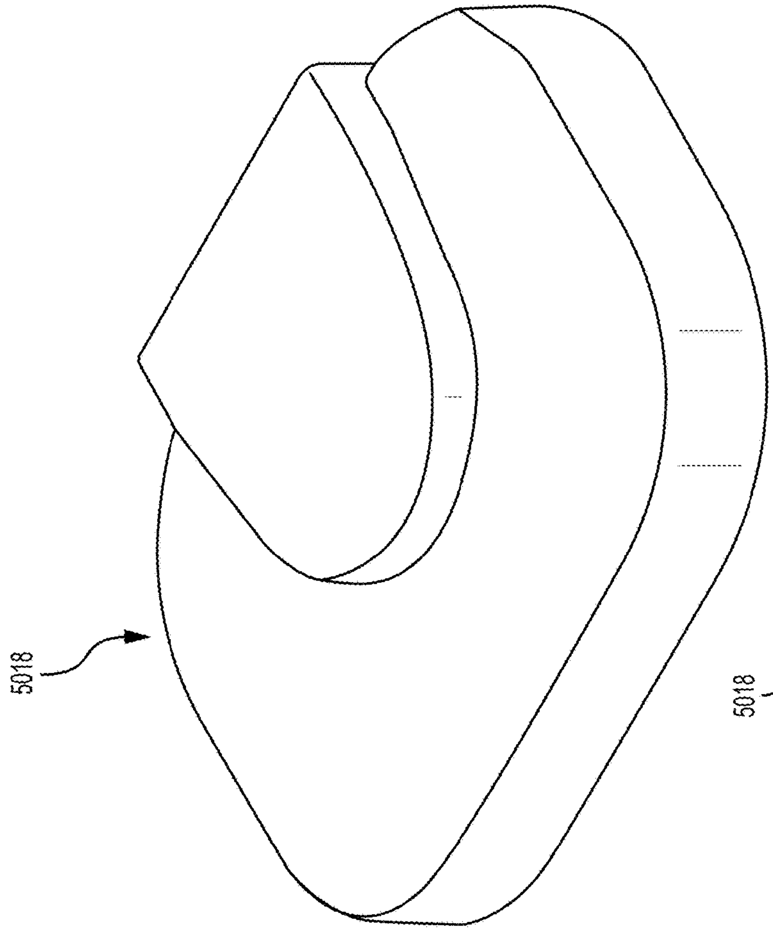
FIG. 33A is a perspective view of a lid for the water reservoir of the device for dispensing water of FIG. 29.
Figure 33B:
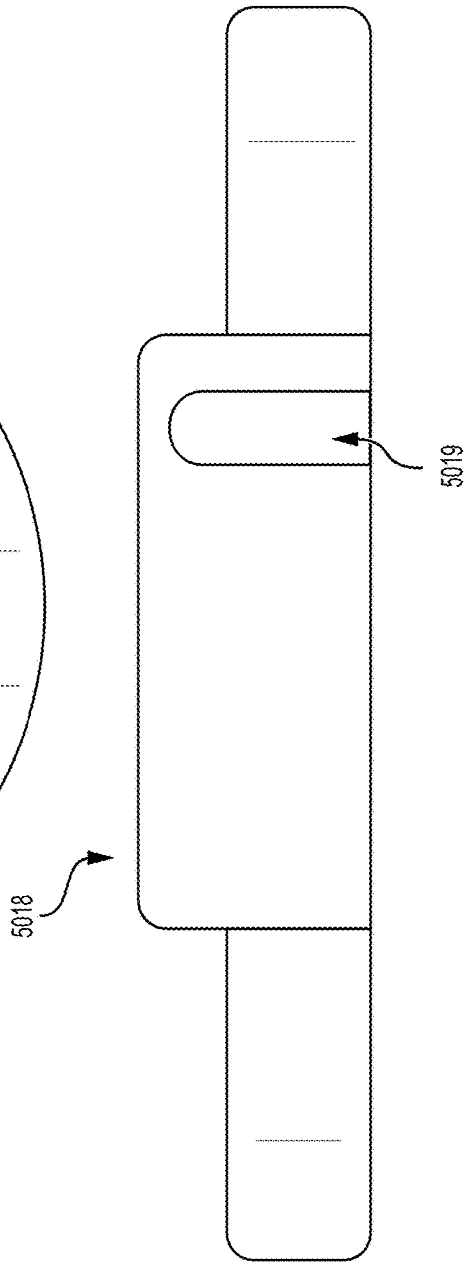
FIG. 33B is a rear view of the lid of FIG. 33A.

At least one water distribution arm is provided. In the non-limiting example of FIG. 29, two water distribution arms 5020, 5022 are provided for respective connection to the two connector ports 5024, 5026. It should be understood that the water distribution arms 5020, 5022 may be substantially identical, as in the non-limiting example of FIG. 29. FIGS. 31 and 32 show one of the water distribution arms 5022, and it should be understood that water distribution arm 5020 may be constructed similarly. As shown, the water distribution arm 5022 has opposed open and closed ends 5038, 5040, respectively, and at least one water distribution arm sidewall 5042. At least one water distribution port 5046 is formed in the at least one water distribution arm sidewall 5042, and at least one drinking valve, such as drinking valve 300 discussed above, is configured to be received within the at least one water distribution port 5046. It should be understood that any suitable type of drinking valve may be inserted into the water distribution ports 5046.

The open end 5038 of the water distribution arm 5022 is releasably connected to, and releasably mated with, the connector port 5026 of the water reservoir 5010. As noted above, the other water distribution arm 5020 is similarly constructed and is releasably connected to, and releasably mated with, the connector port 5024. It should be understood that the overall shape, relative dimensions, and number of water distribution ports 5046 of each of the water distribution arms are shown for exemplary purposes only. Further it should be understood that gaskets or any other suitable types of seals may be used to releasably seal the open ends of the water distribution arms 5020, 5022 to the respective connector ports 5024, 5026.

At least one rim may be mounted on the water reservoir 5010 about the at least one connector port. In the non-limiting example of FIGS. 29 and 30, rim 5030 is mounted about connector port 5024 and rim 5032 is mounted about connector port 5026. As shown in FIG. 31, each of the water distribution arms may have at least one clip member for releasably engaging the corresponding one of the rims. In the non-limiting example of FIG. 31, an upper hook-like clip member 5034 is provided adjacent to the open end 5038, and a lower spring or friction-type clip member 5036 is provided on the opposite side of open end 5038. The two clip members 5034, 5036 respectively engage top and bottom portions of the corresponding rim 5032.

It should be understood that clip members 5034, 5036 are shown for exemplary purposes only, and that any suitable type of, and number of, clip members or other types of releasable attachments may be used for the releasable attachment of the water distribution arms 5020, 5022. Similarly, it should be understood that the shape, overall configuration and relative dimensions of the rims 5030, 5032 are shown for exemplary purposes only. In the non-limiting example of FIG. 30, the rectangular shaped rim 5032 has a vertically-extending member 5033 centrally positioned with respect to the upper edge 5035 of the rim 5032. As shown in FIG. 31, the upper clip member 5034 may have a corresponding gap 5037 for receiving the vertically-extending member 5033, thus preventing the water distribution arm 5022 from sliding horizontally when attached to the rim 5032. The gap 5037 formed in upper clip member 5034, which engages the vertically-extending member 5033, also allows the water distribution arm 5022 to only be releasably attached to the reservoir 5010 in one orientation; e.g., it prevents the water distribution arm 5022 from being attached upside down.

Figure 34:
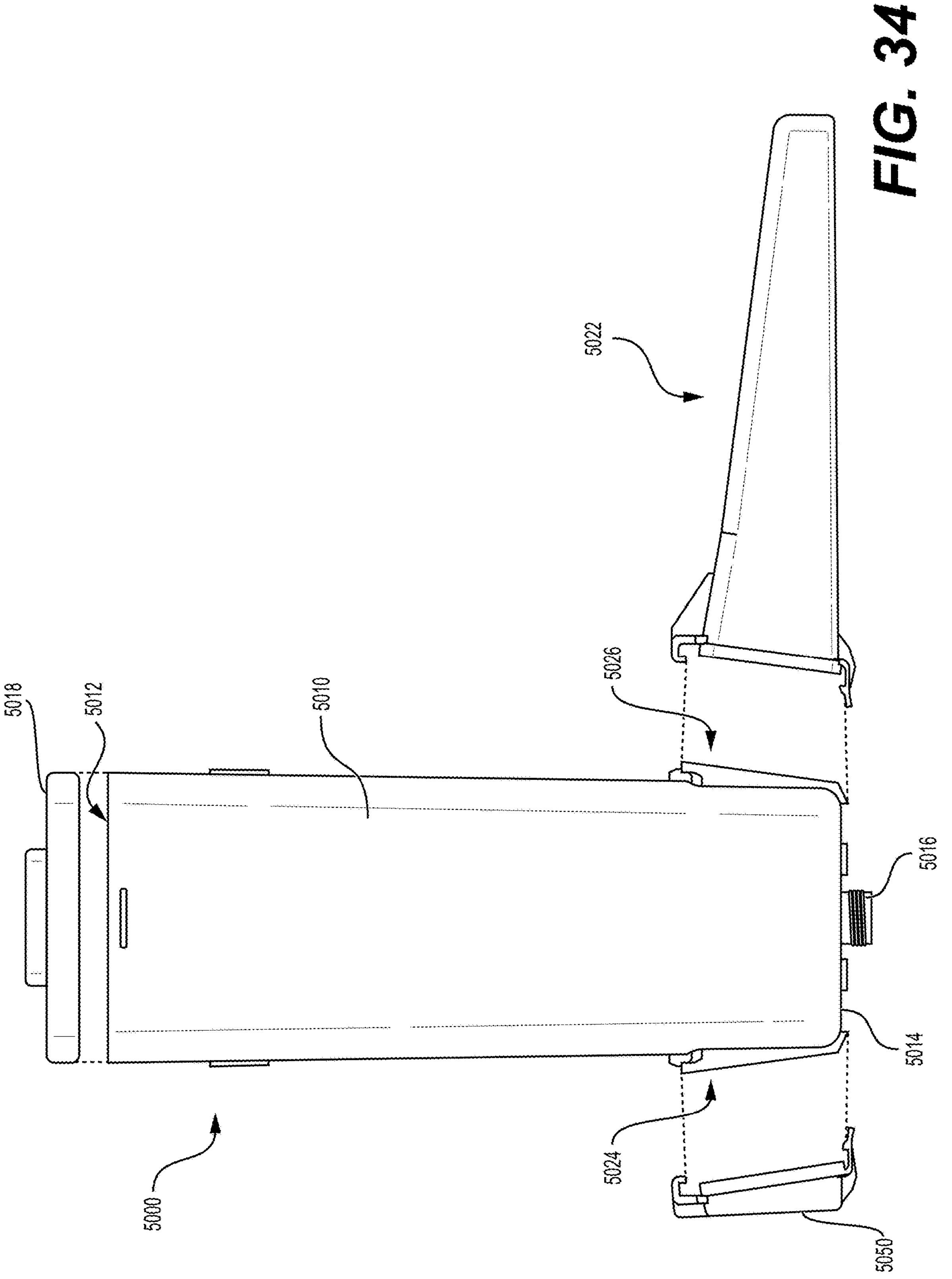
FIG. 34 is an exploded view of an alternative configuration of the device for dispensing water of FIG. 29, including a cap for covering a connection port.
Figure 35:
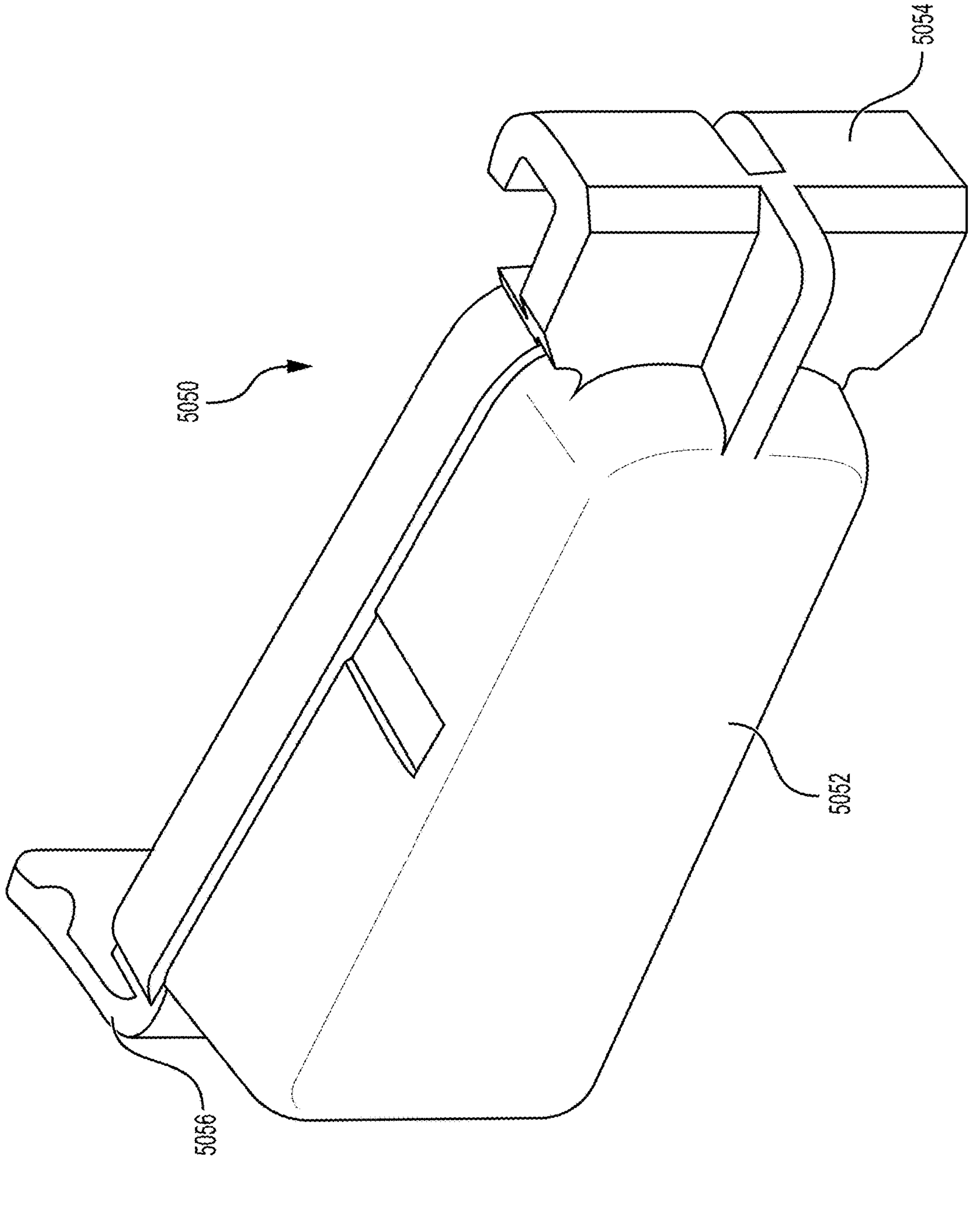
FIG. 35 is a perspective view of the cap of FIG. 34.
Figure 36:
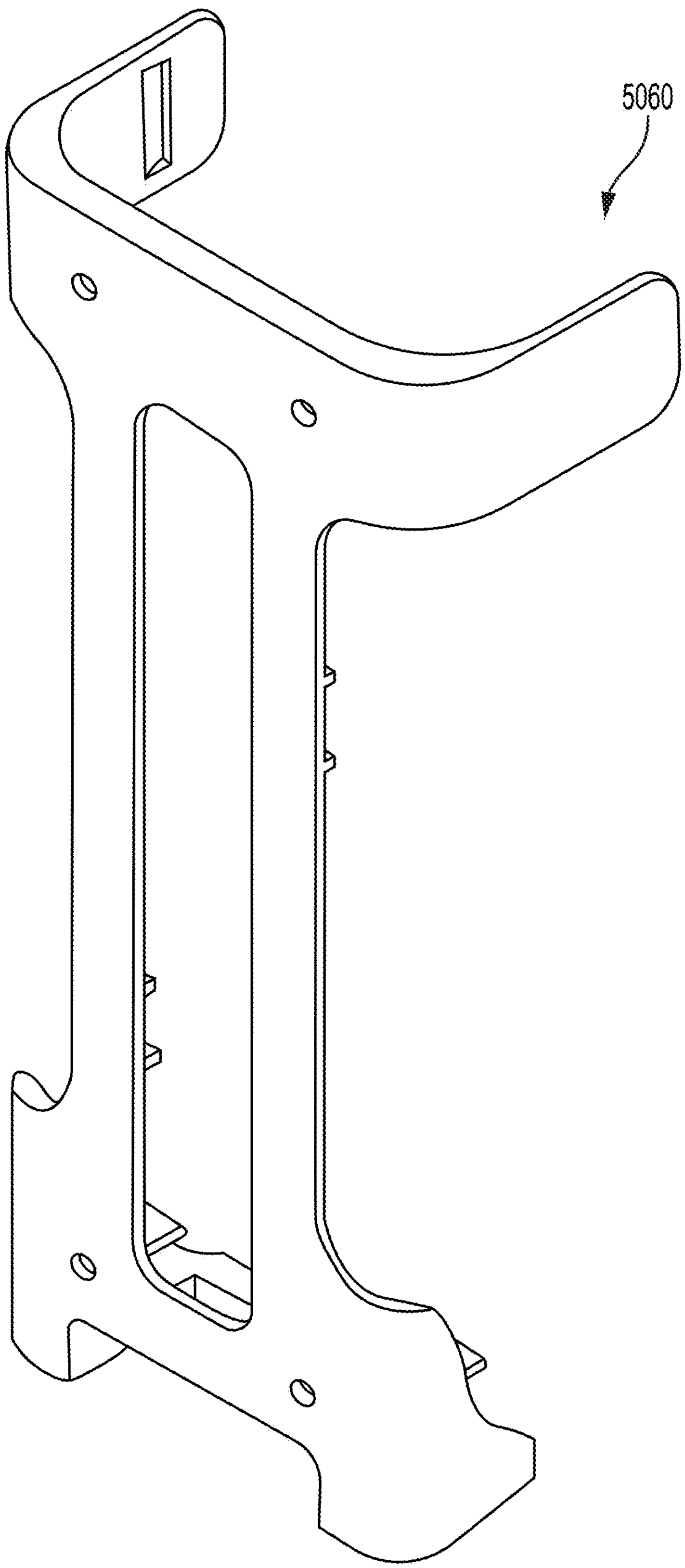
FIG. 36 is a perspective view of an alternative embodiment of the mounting bracket.

As shown in FIGS. 34 and 35, a cap 5050 may be provided for removably covering and sealing one of the connector ports 5024, 5026. As shown in FIG. 34, when only one of the water distribution arms 5022 is being used, the cap 5050 may cover and seal the other connector port 5024. As shown in FIG. 35, the cap 5050 may include a cover plate 5052, an upper hook-like clip member 5054, and a lower spring or friction-type clip member 5056, similar to those of the water distribution arms. It should be understood that the overall shape, configuration and relative dimensions, as well as the type of clip members, of cap 5050 are shown for exemplary purposes only. It should be further understood that the water reservoir 5010, the pair of water distribution arms 5020, 5022, and the cap 5050 may be provided as a kit, thus allowing for the use of both water distribution arms 5020, 5022 at once, or the use of only one of the water distribution arms, with the other connector port being covered by the cap 5050. The kit may also include the lid 5018 for the water reservoir 5010 and a mounting bracket, such as those discussed above with regard to the previous embodiments, for mounting the water reservoir 5010 on a support surface, such as a wall, a fence post or the like. FIG. 36 shows a non-limiting example of another mounting bracket that may be used to supporting the water reservoir 5010. As a non-limiting example, the water reservoir 5010 may be sized and shaped such that the water distribution arms 5020, 5022 and cap 5050 may be received therein when not in use.

Figure 37:
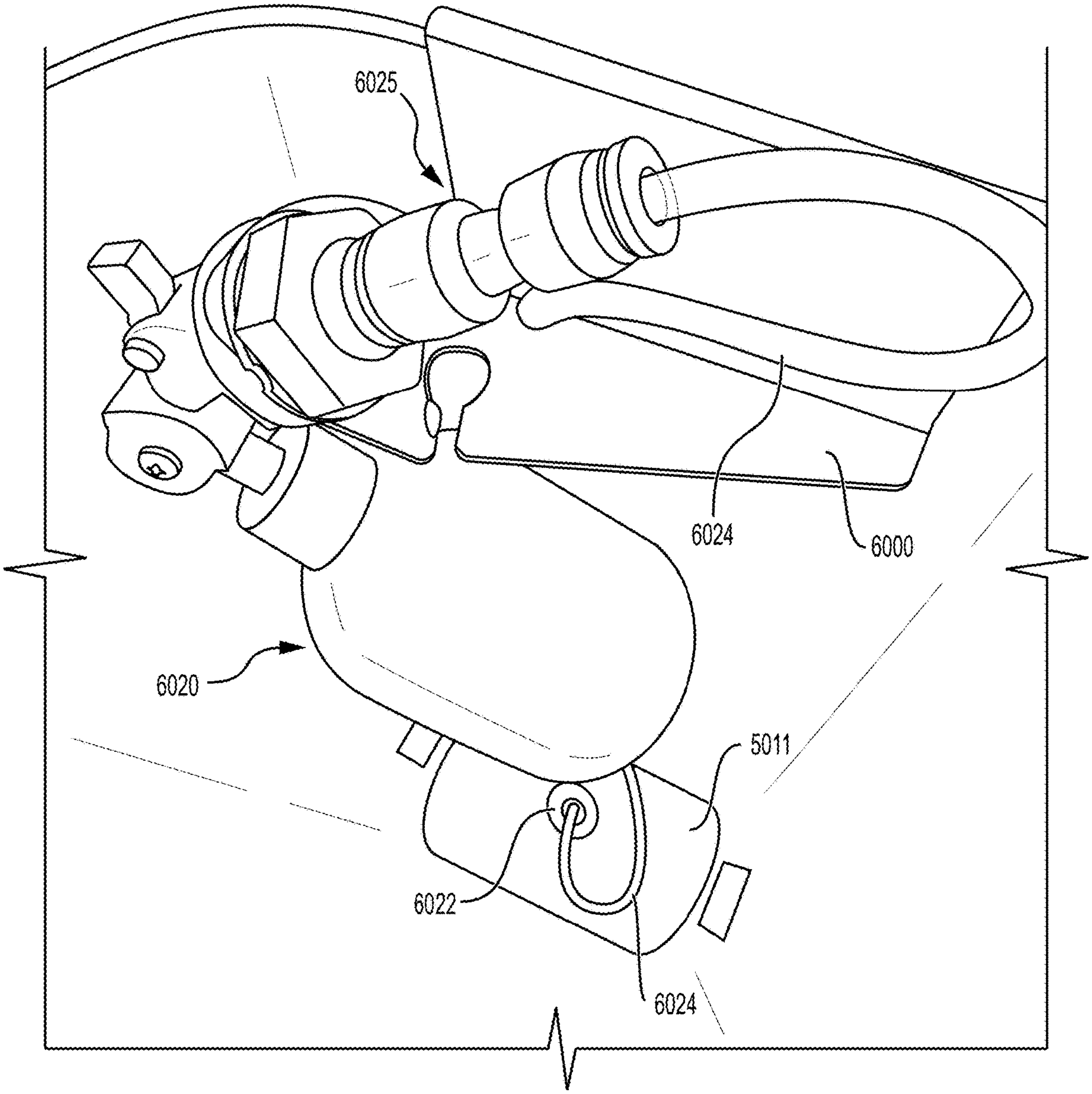
FIG. 37 is a perspective view of an interior of the water reservoir of the device for dispensing water of FIG. 29.

Returning to the water level control mechanism, as discussed above, any suitable type of control valve, such as a float valve or the like, may be used to control the water level within the reservoir 5010. As a non-limiting example, the control valve may be a PureSec® inline shutoff valve, model number JMC-MFS2, manufactured by Shenzhen Liyuan Pure Water Equipment Co., Ltd. of China. In FIG. 37, a non-limiting example of a float valve 6020 is shown supported within the interior of the water reservoir 5010 by an internal bracket 6000. As shown in FIG. 34, a port 5016 (shown in FIG. 34 as being a threaded connector for a garden hose or the like) is formed in lower wall 5011 of the water reservoir 5010. As seen in FIG. 37, a combination adapter and retainer 6022 is received within port 5016 in the interior of the water reservoir 5010. The combination adapter and retainer 6022 receives one end of the tube 6024 for the water dispensing portion 6025 of the float valve 6020. The combination adapter and retainer 6022 seals the port 5016, provides a connection such that the water can flow, under pressure, from the garden hose or the like into the tube 6024, and also holds the tube 6024 in place. The upper end of the tube 6024 is held in place by the internal bracket 6000. As shown, the adapter and retainer 6022 not only holds tube 6024 in place, but acts as an adapter between the large diameter port 5016, which is sized to receive a garden hose, for example, and the small diameter tube 6024. When water pressure is maintained across the transition from the large diameter garden hose to the small diameter tube 6024, the smaller cross-sectional area of tube 6024 results in a lower force acting on the water level control mechanism, thus greatly reducing the potential for unwanted water leakage.

Figure 38A:
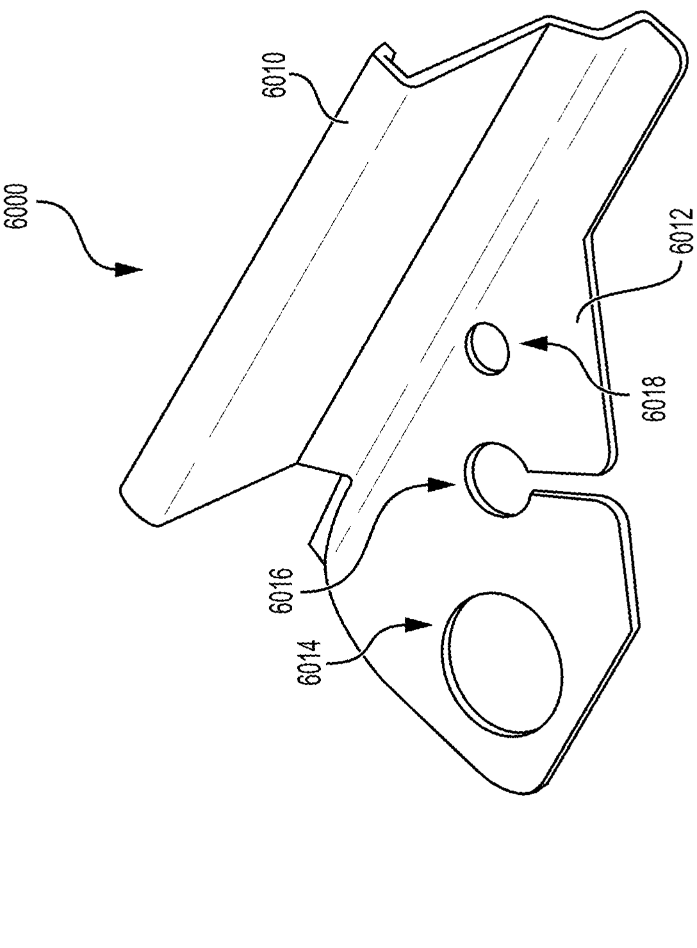
FIG. 38A is a perspective view of an internal bracket for a water level valve of the device for dispensing water.
Figure 38B:
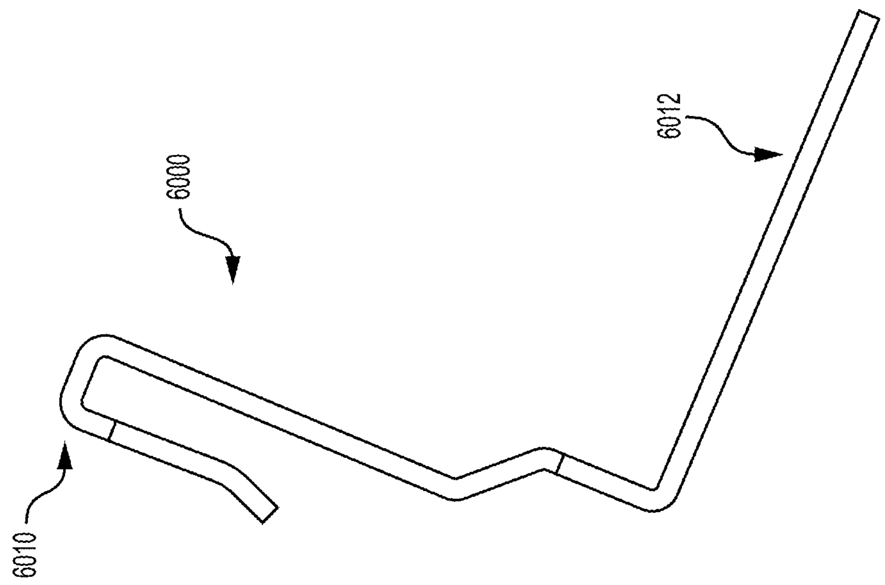
FIG. 38B is a side view of the internal valve of FIG. 37A.

As shown in FIGS. 38A and 38B, the internal bracket 6000 includes a hook or hanger portion 6010 and a plate portion 6012. The hook or hanger portion 6010 is adapted for receiving, and being supported by, the upper rim of the water reservoir 5010 (as shown in FIG. 37). As shown in FIG. 38A, the internal bracket 6000 may have a plurality of holes or openings formed therethrough. Opening 6014 is provided for mounting the float valve 6020 and its water dispensing portion 6025, as illustrated in FIG. 37. Opening 6018 is provided for receiving and stabilizing the upper end of tube 6024, as also illustrated in FIG. 37. An additional opening 6016, which may have an accompanying slot or the like, as shown, may also be provided for receiving and holding one or more wires or cords, such as the cord of, as a non-limiting example, a water temperature sensor received within water reservoir 5010.

Figure 39:
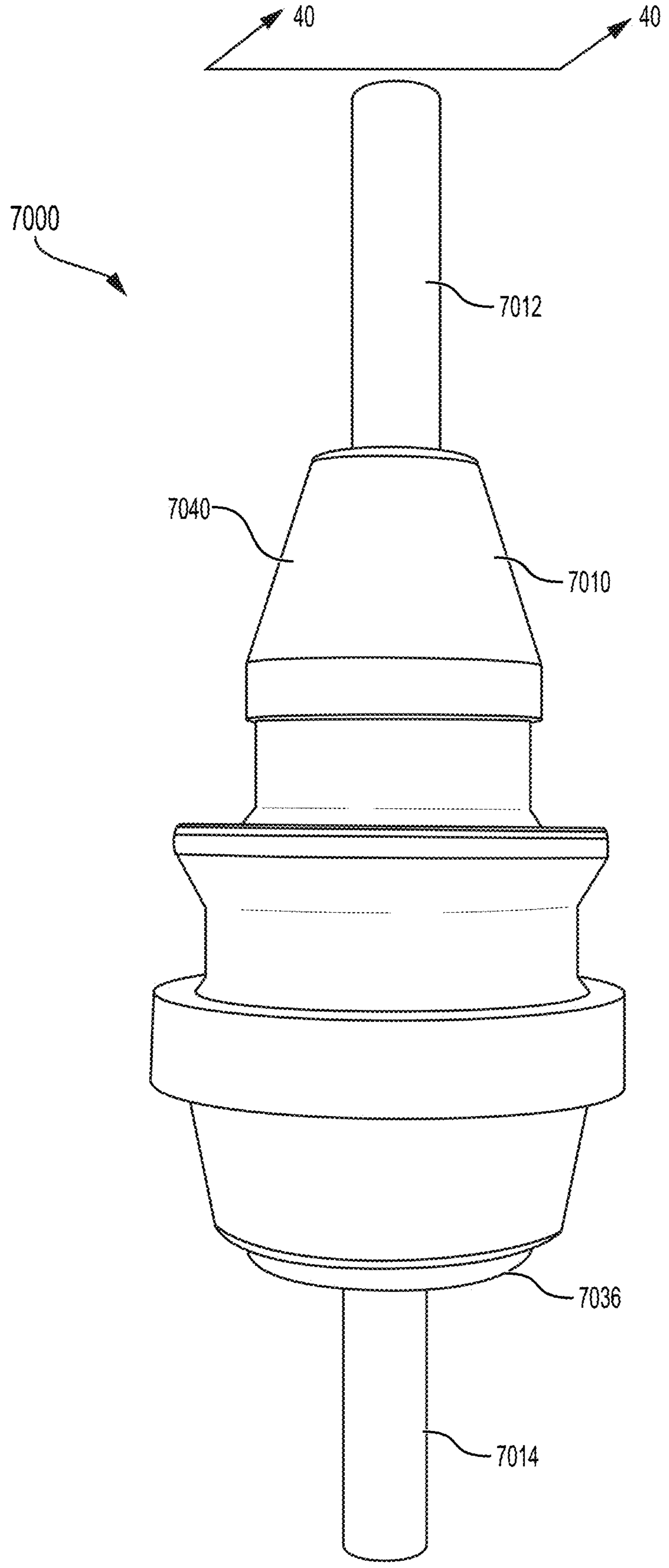
FIG. 39 illustrates a drinking valve used with the device for dispensing water.
Figure 40:
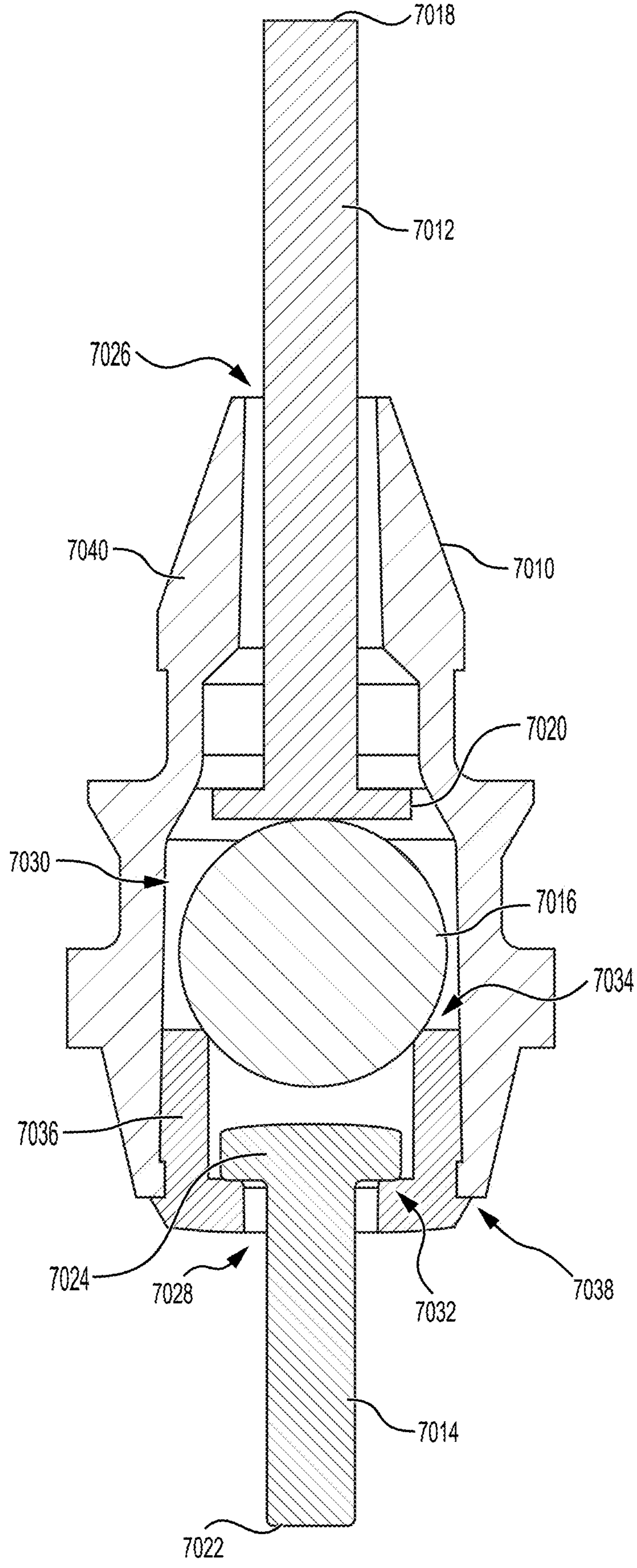
FIG. 40 is a cross-sectional view of the drinking valve of FIG. 39, taken along cross-sectional cut lines 40-40.

As discussed above, any suitable type of drinking valve may be received within the water distribution ports 5046 of the water distribution arms. FIGS. 39 and 40 show a non-limiting example of a drinking valve 7000 which may be used with the water distribution ports 5046 for selectively dripping or delivering water to the fowl. As best shown in FIG. 40, the drinking valve 7000 includes a receiver pin 7012, an actuating pin 7014, and a ball 7016 received within a housing 7010. The receiver pin 7012 has preferably has a receiver pin end 7018 and a receiver pin head 7020, which are located on opposing ends of the receiver pin 7012. The receiver pin 7012 has a receiver pin length, a receiver pin diameter and a receiver pin head diameter.

The actuating pin 7014 has an actuating pin end 7022 and an actuating pin head 7024, which are located on opposing ends of the actuating pin 7014. The actuating pin 7014 has an actuating pin length, an actuating pin diameter and an actuating pin head diameter. The receiver pin diameter may be slightly smaller than a diameter of a first opening 7026 formed through the housing 7010, such that the receiver pin 7012 may pass through the first opening 7026. The receiver pin head diameter is larger than the diameter of the first opening 7026. The actuating pin diameter may also be slightly smaller than the diameter of a second opening 7028 formed in the housing 7010, such that the actuating pin 7014 may pass through the second opening 7028. The actuating pin head diameter is larger than the diameter of the second opening 7028.

The ball 7016 may be spherical, as shown in the non-limiting example of FIG. 40, and a diameter of the ball 7016 may be slightly smaller than a diameter of a valve cavity 7030 formed within housing 7010, although the diameter of ball 7016 is larger than the receiver pin head diameter and the actuating pin head diameter. In embodiments in which the ball is non-spherical (such as an elliptical ball, for example), the ball diameter refers to the minor axis of the ball. The ball 7016 lies between the receiver pin head 7020 and the actuating pin head 7024.

In the closed position, the force of the water is applied to the receiver pin end 7018, which forces the ball 7016 against the actuating pin head 7024, seating the actuating pin head 7024 into an actuating pin seat 7032 of the housing 7010, closing the valve 7000 and stopping flow of water out of valve 7000. When the valve 7000 is in the closed position, the actuating pin end 7022 protrudes out of the housing 7010, while the actuating pin head 7024 is seated in the valve seat 7032 and the ball 7016 is seated in a ball seat 7034 formed within housing 7010. The fowl will then apply pressure to the actuating pin end 7022 by pecking, typically with their beak, moving the actuating pin head 7024 out of the actuating pin seat 7032 and the ball 7016 out of the ball seat 7034, thus releasing water out of the valve 7000. This is the open position of valve 7000.

The valve cavity 7030 may be sized and shaped to minimize or eliminate internal "dead spaces," thus providing no space for contaminants found in the water to settle. Further, as shown in FIG. 40, the valve seat 7032 may be formed in a releasable cap portion 7036 of housing 7010, which is received within a recess 7038 formed in the lower end of the main housing portion 7040. Releasable cap portion 7036 may be removed from the main housing portion 7040 for cleaning of the ball 7016 and other components of the valve 7000.

It is to be understood that the kit and assembly for dispensing fresh water to fowl are not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

The invention claimed is:

1. A device for dispensing water, comprising:

a water reservoir having opposed top and bottom ends and at least one water reservoir sidewall, wherein at least one connector port is formed in the at least one water reservoir sidewall;

at least one water distribution arm having opposed open and closed ends and at least one water distribution arm sidewall, wherein at least one water distribution port is formed in the at least one water distribution arm sidewall; and at least one drinking valve received within the at least one water distribution port, wherein the open end of the at least one water distribution arm is releasably connected to, and releasably mated with, the at least one connector port of the water reservoir, wherein at least one rim is mounted on the water reservoir about the at least one connector port, wherein the at least one water distribution arm has at least one clip member for releasably engaging the at least one rim, the at least one clip member being mounted adjacent to the open end of the at least one water distribution arm, and wherein the at least one clip has an upper clip portion and a lower clip portion, the upper clip portion having a gap formed therein for releasably receiving a vertically-extending member mounted on an upper edge of the at least one rim.

2. The device for dispensing water as recited in claim 1, further comprising a gasket for forming a seal between the at least one connector port and the at least one water distribution arm.

3. The device for dispensing water as recited in claim 1, further comprising a water level control mechanism.

4. The device for dispensing water as recited in claim 3, wherein the water level control mechanism is attached to the water reservoir.

5. The device for dispensing water as recited in claim 1, wherein the top end of the water reservoir is open, the device for dispensing water further comprising a lid for releasably covering the top end of the water reservoir.

6. The device for dispensing water as recited in claim 1, further comprising a mounting bracket for mounting the water reservoir on a support surface.

7. The device for dispensing water as recited in claim 1, further comprising a cap for removably covering and sealing the at least one connector port.

8. A water dispensing kit, comprising:

a device for dispensing water, comprising:

a water reservoir having opposed top and bottom ends and at least one water reservoir sidewall, wherein a pair of connector ports are formed in the at least one water reservoir sidewall;

a pair of water distribution arms each having opposed open and closed ends and at least one water distribution arm sidewall, wherein at least one water distribution port is formed in the at least one water distribution arm sidewall of each of the water distribution arms; and at least one drinking valve received within the at least one water distribution port of each of the water distribution arms, wherein the open end of each of the water distribution arms is releasably connected to, and releasably mated with, a corresponding one of the connector ports of the water reservoir, wherein a pair of rims are mounted on the water reservoir respectively about the pair of connector ports, wherein each of the water distribution arms has at least one clip member for releasably engaging one of the rims, wherein the at least one clip member is mounted adjacent to the open end of each of the water distribution arms, and wherein the at least one clip has an upper clip portion and a lower clip portion, the upper clip portion having a gap formed therein for releasably receiving a vertically-extending member mounted on an upper edge of the at least one rim; and a cap configured for removably covering and sealing one of the connector ports.

9. The water dispensing kit as recited in claim 8, wherein the cap has at least one clip member for releasably engaging one of the rims.

10. The water dispensing kit as recited in claim 9, wherein the at least one clip member of the cap has an upper clip member portion and a lower clip member portion, the upper clip member portion having a gap formed therein for releasably receiving the vertically-extending member mounted on the upper edge of the at least one rim.

11. The water dispensing kit as recited in claim 8, further comprising a mounting bracket.

* * * * *